(12) United States Patent
Nagase et al.

(10) Patent No.: US 9,733,649 B2
(45) Date of Patent: Aug. 15, 2017

(54) FLOW CONTROL SYSTEM WITH BUILD-DOWN SYSTEM FLOW MONITORING

(71) Applicant: FUJIKIN INCORPORATED, Osaka (JP)

(72) Inventors: Masaaki Nagase, Osaka (JP); Atsushi Hidaka, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 9 days.

(21) Appl. No.: 14/404,418

(22) PCT Filed: Apr. 15, 2013

(86) PCT No.: PCT/JP2013/002542
§ 371 (c)(1),
(2) Date: Nov. 26, 2014

(87) PCT Pub. No.: WO2013/179550
PCT Pub. Date: Dec. 5, 2013

(65) Prior Publication Data
US 2015/0136248 A1    May 21, 2015

(30) Foreign Application Priority Data
May 31, 2012    (JP) .................................. 2012-124339

(51) Int. Cl.
*G01F 15/00*    (2006.01)
*G01F 1/36*    (2006.01)
*G05D 7/06*    (2006.01)

(52) U.S. Cl.
CPC ............. *G05D 7/0635* (2013.01); *G01F 1/36* (2013.01); *G01F 15/005* (2013.01); *Y10T 137/7737* (2015.04)

(58) Field of Classification Search
CPC ....... G05D 7/0635; G01F 1/36; G01F 15/005; Y10T 137/7737
(Continued)

(56) References Cited

U.S. PATENT DOCUMENTS 6,363,958 B1 *  4/2002  Ollivier ................ G05D 7/0647
                                                              137/2
6,857,618 B2 *  2/2005  Ludwig ..................... F01L 9/02
                                                              123/90.12
(Continued)

FOREIGN PATENT DOCUMENTS

JP      06-041759 A     2/1994
JP      07-281760 A    10/1995
(Continued)

OTHER PUBLICATIONS

International Search Report issued in corresponding application No. PCT/JP2013/002542, completed May 1, 2013 and mailed May 14, 2013.

*Primary Examiner* — Kevin Murphy
*Assistant Examiner* — Patrick Williams
(74) *Attorney, Agent, or Firm* — Griffin and Szipl PC

(57) ABSTRACT

To provide a flow control system with build-down system flow monitoring that realizes flow monitoring close to real-time monitoring by combining build-down system flow rate measurement with the upstream side of the flow control system without using a thermal type flow sensor by effectively utilizing high pressure fluctuation resistance characteristics of the flow control system, and can be significantly downsized and reduced in cost.

9 Claims, 19 Drawing Sheets

(58) Field of Classification Search
USPC .......... 137/487.5, 624.12; 251/30.01–30.05
See application file for complete search history.

(56) References Cited

U.S. PATENT DOCUMENTS

| | | | |
|---|---|---|---|
| 7,823,436 B2* | 11/2010 | Monkowski | G01F 25/0038 73/1.26 |
| 7,979,165 B2* | 7/2011 | Gotoh | G01F 1/6847 137/2 |
| 8,271,211 B2* | 9/2012 | Chung | G01F 1/34 137/2 |
| 8,931,506 B2* | 1/2015 | Nagata | B01B 1/005 118/726 |
| 2004/0204794 A1 | 10/2004 | Ohmi et al. | |

FOREIGN PATENT DOCUMENTS

| | | |
|---|---|---|
| JP | 2635929 B2 | 4/1997 |
| JP | 2982003 B2 | 9/1999 |
| JP | 2000-214916 A | 8/2000 |
| JP | 2003-195948 A | 7/2003 |
| JP | 2003-529218 A | 9/2003 |
| JP | 2004-246826 A | 9/2004 |
| JP | 2008-504613 A | 2/2008 |
| JP | 4137666 B2 | 6/2008 |
| JP | 4308356 B2 | 5/2009 |
| JP | 2011-510404 A | 3/2011 |
| WO | 00/68753 A1 | 11/2000 |
| WO | 01/73820 A2 | 10/2001 |
| WO | 2006/014508 A2 | 2/2006 |
| WO | 2009/091935 A1 | 7/2009 |

* cited by examiner

PRIOR ART

FLOW CONTROL SYSTEM WITH BUILD-DOWN SYSTEM FLOW MONITORING

This is a National Phase Application in the United States of International Patent Application No. PCT/JP2013/002542 filed Apr. 15, 2013, which claims priority on Japanese Patent Application No. JP2012-124339, filed May 31, 2012. The entire disclosures of the above patent applications are hereby incorporated by reference.

TECHNICAL FIELD

The present invention relates to an improvement in a flow control system with flow monitoring, and specifically, to a flow control system with build-down system flow monitoring that can monitor in real time a controlled flow rate of a flow control system being operated by organically combining a build-down system flow monitor with a thermal type flow control system with supply pressure fluctuation resistance characteristics or a pressure type flow control system using an orifice.

BACKGROUND OF THE INVENTION

Conventionally, a thermal type flow control system MFC and a pressure type flow control system FCS are widely used in a gas supplying apparatus for a semiconductor control device, and in recent years, a thermal type flow control system with improved supply pressure fluctuation resistance characteristics is increasingly used.

FIG. 33 shows the arrangement of a pressure type flow control system FCS. This pressure type flow control system FCS includes a control valve CV, a temperature detector T, a pressure detector P, an orifice OL, and an arithmetic and control unit CD, etc. The arithmetic and control unit CD includes a temperature correction/flow rate arithmetic circuit CDa, a comparison circuit CDb, an input-output circuit CDc and an output circuit CDd, etc., and has excellent characteristics keeping stable flow control characteristics against fluctuation of a primary side supply pressure.

Referring to FIG. 33, detection values from the pressure detector P and the temperature detector T are converted into digital signals and input into the temperature correction/flow rate arithmetic circuit CDa, and here, temperature correction of the detected pressure and flow rate computation are performed, and then the computed flow rate value Qt is input into the comparison circuit CDb. In addition, an input signal Qs of a set flow rate is input from a terminal In, and converted into a digital value by the input-output circuit CDc, and then input into the comparison circuit CDb, and, thereafter, compared with the computed flow rate value Qt from the temperature correction/flow rate arithmetic circuit CDa. As a result of the comparison, when the computed flow rate value Qt is larger than the set flow rate input signal Qs, a control signal Pd is output to the drive unit of the control valve CV. Accordingly, the control valve CV is driven in a closing direction, and is driven in the valve closing direction until the difference (Qs−Qt) between the set flow rate input signal Qs and the computed flow rate value Qt becomes zero.

The pressure type flow control system FCS has excellent characteristics in which when the relationship of $P_1/P_2 \geq$ approximately 2 (herein referred to as the critical expansion condition) is kept between the downstream side expansion pressure $P_2$ of the orifice OL (that is, the pressure $P_2$ on the process chamber side) and the upstream side pressure $P_1$ of the orifice OL (that is, the pressure $P_1$ on the outlet side of the control valve CV), the flow rate Q of the gas $G_0$ distributed through the orifice OL is $Q=KP_1$ (here, K is a constant), the flow rate Q can be controlled with high accuracy by controlling the pressure $P_1$, and even when the pressure of the gas $G_0$ on the upstream side of the control valve CV greatly changes, the controlled flow rate value hardly changes.

The pressure type flow control system FCS and the thermal type flow control system with pressure fluctuation resistance characteristics are known, therefore, detailed descriptions thereof are omitted here.

However, for example, in the pressure type flow control system FCS, an orifice OL with a minute hole diameter is used, so that the hole diameter of the orifice OL changes over time due to corrosion caused by a halogen-based gas and precipitation of a reactant gas, etc. As a result, the controlled flow rate value of the pressure type flow control system FCS and the actual flow rate value of the gas $G_0$ actually distributed become different from each other, and to detect this difference, so-called flow monitoring has to be frequently performed, and this greatly affects the operability of the semiconductor manufacturing equipment and the quality of a manufactured semiconductor.

Therefore, in the field of pressure type flow control systems, conventionally, a method is widely used for preventing the controlled flow rate value of the pressure type flow control system FCS and the actual flow rate value of the gas $G_0$ actually distributed from becoming different from each other by detecting a change in hole diameter of the orifice OL as early as possible, and, in order to detect the change in hole diameter of the orifice OL, a gas flow rate measuring method using a so-called build-up system or build-down system is adopted in many cases.

However, in the conventional gas flow rate measurement using a so-called build-up system or build-down system, actual gas supply has to be temporarily stopped, and as a result, the operation rate of the semiconductor manufacturing equipment is lowered, or the quality, etc., of a manufactured semiconductor is greatly affected.

Therefore, in recent years, in the field of thermal type flow control systems and pressure type flow control systems, a flow control system with flow monitoring that can easily monitor in real time whether supply gas flow control is being properly performed without temporarily stopping actual gas supply has been developed.

For example, FIG. 34 shows an example. A flow control system 20 with flow monitoring, being a thermal type mass flow control system (mass flow controller), includes a flow passage 23, a first pressure sensor 27a for an upstream side pressure, a control valve 24, a thermal type mass flow sensor 25 provided on the downstream side of the control valve 24, a second pressure sensor 27b provided on the downstream side of the thermal type mass flow sensor 25, a throttle unit (sonic nozzle) 26 provided on the downstream side of the second pressure sensor 27b, an arithmetic and control unit 28a, and an input-output circuit 28b, etc.

The thermal type mass flow sensor 25 includes a rectifier body 25a inserted into the flow passage 23, a branched flow passage 25b branched by a flow rate of a predetermined proportion of F/A from the flow passage 23, and a sensor main body 25c provided on the branched flow passage 25b, and outputs a flow rate signal Sf showing a total flow rate F.

The throttle unit 26 is a sonic nozzle that provides a fluid at a flow rate corresponding to a primary side pressure when a pressure difference between the primary side and the secondary side of the throttle unit is greater than or equal to a predetermined value. In FIG. 34, the reference symbols SPa and SPb denote pressure signals, Pa and Pb denote pressures, F denotes a total flow rate, Sf denotes a flow rate signal, and Cp denotes a valve opening degree control signal.

The arithmetic and control unit 28a feed-back controls the control valve 24 by feeding-back pressure signals Spa and Spb from the pressure sensors 27a and 27b and a flow rate control signal Sf from the flow sensor 25 and outputting a valve opening degree control signal Cp. That is, a flow rate setting signal Fs is input into the arithmetic and control unit 28a via the input-output circuit 28b, and the flow rate F of the fluid flowing in the mass flow control system 20 is adjusted so as to match the flow rate setting signal Fs.

In detail, by controlling the opening and closing of the control valve 24 by feed-back controlling the control valve 24 by the arithmetic and control unit 28a by using the output (pressure signal Spb) of the second pressure sensor 27b, the flow rate F of the fluid flowing in the sonic nozzle 26 is controlled, and by using an output (flow rate signal Sf) of the thermal type flow sensor 25 at this time, the flow rate F of the actual flow is measured, and, by comparing the measured value of this flow rate F and the controlled value of the flow rate F, the operation of the mass flow control system 20 is confirmed.

Thus, in the flow control system 20 with flow monitoring shown in FIG. 34, two measuring systems of pressure type flow rate measurement using the second pressure sensor 27b for performing flow control and flow rate measurement using the thermal type flow sensor 25 for monitoring the flow rate are installed in the arithmetic and control unit 28a, so that, whether or not the fluid at the controlled flow rate (set flow rate Fs) is actually flowing, that is, whether or not the controlled flow rate and the actual flow rate are different from each other can be easily and reliably monitored in real time, so that a high practical effect is obtained.

However, many problems that should be solved still remain in the flow control system 20 with flow monitoring shown in FIG. 34.

A first problem is that since two different flow rate measuring systems of pressure type flow rate measurement using the second pressure sensor 27b for performing flow control and flow rate measurement using the thermal type flow sensor 25 for monitoring the flow rate are utilized, the structure of the flow control system 20 with flow monitoring becomes complicated, and the system cannot be downsized and reduced in manufacturing cost.

A second problem is that the arithmetic and control unit 28a is arranged to control the opening and closing of the control valve 24 by using the signals of both of an output SPb of the second pressure sensor 27b and a flow rate output Sf of the thermal type flow sensor 25, and correct the flow rate output Sf of the thermal type flow sensor 25 by using an output SPa of the first pressure sensor 27a, and opening and closing of the control valve 24 are controlled by using three signals of the two pressure signals SPa and SPb of the first pressure sensor 27a and the second pressure sensor 27b and the flow rate signal Sf from the thermal type flow sensor 25. Therefore, not only does the make up of the arithmetic and control unit 28 become complicated, but also the stable flow control characteristics and excellent high responsiveness of the pressure type flow control system FCS are lessened adversely.

CITATION LIST

Patent Documents

Patent Document 1: Japanese Patent No. 2635929
Patent Document 2: Japanese Patent No. 2982003
Patent Document 3: Japanese Patent No. 4308356
Patent Document 4: Japanese Patent No. 4137666

SUMMARY OF THE INVENTION

Problems to be Solved by the Invention

A main object of the present invention is to solve the problem (a) in which in a conventional flow control system with flow monitoring using a build-down system or build-up system flow rate measuring method, actual gas supply has to be temporarily stopped at the time of flow monitoring, so that deterioration of the operation rate of the semiconductor manufacturing equipment and quality fluctuation of a manufactured semiconductor, etc., are caused, and the problem (b) in which in a conventional flow control system with flow monitoring having a combined structure of a thermal type flow meter and a pressure type flow control system as shown in FIG. 34, the flow control system itself cannot be structurally simplified and downsized, and excellent response characteristics and stable flow control characteristics of the pressure type flow control system are lessened, etc. These problems are solved by various embodiments of the present invention, by integrally combining the pressure type flow control system FCS or supply pressure fluctuation resistant thermal type flow control system MFC and a build-down system flow rate measuring unit provided on the upstream side of the pressure type flow control system FCS or supply pressure fluctuation resistant thermal type flow control system MFC, operating the build-down system flow rate measuring unit within a pressure fluctuation range allowable for the upstream side pressure (input side pressure) of the flow control system, and transmitting a flow monitoring signal from the build-down system flow rate measuring unit at least once per second (preferably, a plurality of times per second). Thereby, flow monitoring in close approximation to real-time monitoring can be performed by the build-down system flow rate measuring unit simultaneously with flow control by the flow control system.

With the above-described structure, a flow control system with build-down system flow monitoring can be provided that can perform flow monitoring by the build-down system flow monitoring unit in close approximation to real-time (at least once per second) by fully utilizing the flow rate characteristics of the pressure type flow control system or supply pressure fluctuation resistant thermal type flow control system the flow control characteristics of which is hardly influenced by pressure fluctuation on the input side, and enables simplification of the arithmetic and control unit, significant downsizing of the system main body, and an improvement in gas replaceability, etc.

Means for Solving the Problems

The inventors of the present application have constructed test equipment shown in FIG. 1 first by using the pressure type flow control system FCS using an orifice, and conducted various basic tests relating to flow rate measurement by using a build-down system in which the flow rate was calculated from the gradient of a pressure drop between the pressure type flow control system FCS and the upstream side (primary side) valve AV.

That is, in FIG. 1, the reference symbol $N_2$ denotes a gas supply source, RG denotes a pressure regulator, ECV denotes an electromagnetic drive unit, AV denotes an upstream side valve, FCS denotes a pressure type flow control system, VP denotes a vacuum pump, BC denotes a build-down capacity, T denotes a temperature detection sensor, $P_0$ denotes a pressure sensor output from a pressure sensor provided inside the pressure type flow control system FCS, $E_1$ denotes a power supply for a pressure type flow control system, $E_2$ denotes a power supply for an arithmetic and control unit, $E_3$ denotes a power supply for an upstream side valve, S denotes a signal generator, CP denotes an arithmetic and control unit, CPa denotes a pressure type flow rate arithmetic and control unit, CPb denotes a build-down monitoring flow rate arithmetic and control unit, PC denotes an arithmetic and display unit, and NR denotes a data logger.

The build-down capacity BC is equivalent to a pipe passage spatial volume between the outlet side of the upstream side valve AV and the inlet side of the control valve (not illustrated) of the pressure type flow control system FCS, and the build-down capacity BC can be adjusted to switch to 1.78 cc and 9.91 cc, 4.6 to 11.6 cc, and 1.58 cc to 15.31 cc by adjusting the length and inner diameter, etc., of the pipe passage or adjusting the internal volume of a build-down chamber (not illustrated) interposed in this pipe passage.

When the build-down chamber is used, as described later in an illustrative example, the inner diameter of the flow passage between the outlet of the upstream side valve AV and the inlet of the control valve CV is set to 1.8 mm, and the build-down capacity BC is selected to be 1.58 cc to 15.31 cc.

In the build-down monitoring flow rate arithmetic and control unit CPb inside the arithmetic and control unit CP, as described later, a necessary monitoring flow rate is computed by using a pressure drop rate of the build-down capacity BC portion, and further, in the pressure type flow rate arithmetic and control unit CPa, computation of the flow rate distributed through the orifice (not illustrated) and opening/closing control of the control valve (not illustrated), etc., are performed in the same manner as in the arithmetic and control unit of the conventional pressure type flow control system FCS.

The pressure type flow control system FCS, the upstream side valve AV, the pressure regulator RG, and other devices are all known, therefore, descriptions thereof are omitted here.

The pressure type flow rate arithmetic and control unit CPa is generally installed inside the arithmetic and control unit CP, however, in FIG. 1, for convenience of description, the pressure type flow rate arithmetic and control unit CPa is shown in a state where it is separated from the arithmetic and control unit CP. Further, the upstream side valve AV has to perform opening and closing in a short time, so that a direct-operated solenoid valve is preferably used, however, an air-operated valve provided with a pilot solenoid valve may also be used as a matter of course.

The flow control system is hardly influenced by gas supply pressure fluctuation, and is specifically a pressure type flow control system FCS using an orifice, so that the build-down system flow rate measuring unit can be disposed on the upstream side of the flow control system. It is generally known that highly accurate flow rate measurement can be made by flow rate measurement using the build-down system.

That is, in the build-down system, the flow rate Q distributed inside the build-down capacity BC can be calculated by the following equation (1).

$$Q(sccm) = \frac{1(atm)}{760(Torr)} \times 1000(cc/l) \times 60 \quad \text{[Numerical Equation 1]}$$

-continued
$$(sec/min) \times \frac{273(K)}{(273+T)(K)} \times V(l) \times \frac{\Delta p(Torr)}{\Delta t(sec)}$$

Here, V is the volume (l) of the build-down capacity BC, $\Delta P/\Delta t$ is a pressure drop rate in the build-down capacity BC, and T is a gas temperature (° C.).

First, in the test equipment shown in FIG. 1, the upstream side pressure of the pressure type flow control system FCS was set to 400 kPa abs, the pressure difference $\Delta P$ was set to 50 kPa abs or more, the build-down capacity BC was set to 4.6 to 11.6 cc, and flow rate measurement using the build-down system was performed. FIG. 2 shows a pressure drop state at this time, and it was found that the flow rate itself could be measured with comparatively high accuracy, however, the pressure recovery time (a) was necessary, therefore, the output of the measured flow rate became discontinuous, and the time required for one cycle was several seconds or longer. As a result, it was found that under this measurement condition, the flow monitoring became significantly different from so-called real-time flow monitoring.

That is, when the time until the pressure reaches a prescribed value or more after the upstream side valve AV is opened is defined as a pressure recovery time (a), and the time until the pressure reaches the prescribed value or less after the upstream side valve AV is closed is defined as a flow rate output enabling time (b), according to the ratio of (a) and (b), the percentage of time during which flow rate output is possible is determined. This flow rate output enabling time (b) is determined according to the controlled flow rate of FCS, the build-down capacity BC, and a pressure drop range $\Delta P$, therefore, it was found that unless the controlled flow rate of FCS, the build-down capacity BC, and the pressure drop range $\Delta P$ were more strictly examined and set to appropriate values, respectively, flow rate measurement using the build-down system cannot be made closer to real-time flow monitoring.

On the other hand, as real-time flow monitoring, ideally, continuous flow rate output is necessary, however, in actual operation of the semiconductor manufacturing equipment, etc., flow monitoring almost closer to real-time monitoring is possible as long as a flow rate output can be obtained at least once or more per second.

Therefore, in flow rate measurement using the build-down system, to realize flow monitoring close to real-time monitoring by obtaining a flow rate output at least once or more per second, the inventors of the present application conceived that the time necessary for gas refilling (pressure recovery time (a)) is made shorter by making smaller the pressure drop range (pressure difference) $\Delta P$ and build-down capacity BC. Based on this idea, the inventors considered whether or not the real-time performance could be secured by reducing the build-down capacity BC and the pressure drop range (pressure difference) $\Delta P$ of the upstream side in the flow control system to be used in semiconductor manufacturing equipment, and conducted various tests relating to the flow monitoring accuracy and reproducibility, etc.

[Test 1]

First, in the test equipment shown in FIG. 1, as the pressure type flow control system FCS, three types of FCSs the rated flow rates of which were F20, F200, and F600 (sccm) were prepared.

The build-down capacity BC was set to two values of approximately 1.78 cc and approximately 9.91 cc. The build-down capacity BC of 9.91 cc was adjusted by adjusting the pipe length and pipe inner diameter.

Further, 0.5 sec (0.25 ms×2000 points) was set as a target flow rate output detection enabling time (b), and the test environment temperature was set to 25° C.±1° C.

Next, the FCS upstream side pressure was set to 370 kPa$_{abs}$, the pressure difference was set to ΔP=20 kPa$_{abs}$, the flow rate N$_2$=100 sccm was set (set on the FCS side), and the pressure recovery characteristic (pressure recovery time (a)) at the time of build-down system flow rate measurement was measured.

FIG. 3 shows results of measurement of the pressure recovery characteristic, and FIG. 4 is an enlarged view thereof.

Further, FIG. 5 shows the pressure drop characteristic at this time.

As is clear from FIG. 4, in FIG. 3, it was confirmed that by reducing the build-down capacity BC to 1.78 cc and the pressure drop range ΔP to 20 kPa$_{abs}$, the refilling time (pressure recovery time (a)) could be significantly shortened even at the N$_2$ flow rate of 100 sccm, and as shown in FIG. 5, the measured flow rate output could be performed at intervals of at least 1 second or less.

In relation to Test 1, it was found that the opening and closing speed of the upstream side valve AV had a great influence in making the pressure recovery time (a) shorter than the flow rate output enabling time (b). Therefore, it was found that a direct-mounting type solenoid valve was preferably used as the upstream side valve AV.

It was also found that shortening of the pressure recovery time (a) by reducing the pressure drop range ΔP and the volume V of the build-down capacity BC led to shortening of the pressure drop time (flow rate output enabling time (b)), so that the relationship among the measured flow rate, the build-down capacity BC, and the pressure drop time (b) was especially important.

TABLE 1

Gas flow rate and drop time per one cycle when the build-down capacity is 1.78 cc

| Flow rate (sccm) | Drop time (s) |
|---|---|
| 5 | 4.22 |
| 10 | 2.11 |
| 50 | 0.42 |
| 100 | 0.21 |

Table 1 shows the relationship between the measured flow rate (sccm)(standard cubic centimeters per second) and the pressure drop time (sec) when the build-down capacity BC was set to 1.78 cc, and it is shown that when the build-down capacity BC is 1.78 cc, it becomes difficult to perform flow rate output once or more within 1 second if the flow rate is 50 sccm or less, and it becomes difficult to perform flow monitoring equivalent to real-time monitoring.

On the other hand, the pressure drop characteristic in the flow rate output enabling time (b) must have linearity in terms of measurement errors, and the range in which the flow rate calculation is possible is limited to the range in which the pressure drop rate is constant (that is, the portion with linearity).

FIG. 6 to FIG. 8 show the results of investigation on patterns of the pressure drop characteristic when the measured flow rate was 100, 50, and 10 sccm, and in each case, the pressure drop characteristic lost linearity immediately after build-down. In this case, the build-down capacity BC is 1.78 cc, and the fluid is a N$_2$ gas.

It is estimated that the deviations from the linearity immediately after build-down shown in FIG. 6 to FIG. 8 are caused by a gas internal temperature change due to adiabatic expansion of the gas according to a pressure change. It is found that as the measured flow rate becomes smaller, the deviation from the linearity tends to become larger, and this narrows the time width in which flow rate calculation is possible.

Next, a flow rate measurement error caused by deviation from linearity of the pressure drop characteristic curve was measured by measuring 5 points every 0.25 seconds in the case where the flow rate measurement enabling time (b) is within 1 second.

That is, in a state where the build-down capacity BC was set to 1.78 cc and 9.91 cc, the pressure drop range ΔP was set to 20 kPa$_{abs}$, and the time from closing of the upstream side valve AV to flow rate stabilization was set to 1 second, the flow rate was calculated every 0.25 seconds, and the error in the calculated flow rate with respect to the controlled flow rate was examined.

FIG. 9 and FIG. 10 show the results of the examination, and in each case, it was found that when 0.25 seconds or more elapsed from closing of the upstream side valve AV, the error significantly decreased. That is, it was confirmed that as the pressure drop characteristic curve becomes closer to the straight line, the error decreased.

Table 2 shows the relationship among the build-down capacity BC, the measured flow rate, and the pressure drop time (b), and in the case where the build-down capacity BC=1.78 cc, flow rate output can be performed at intervals of approximately 1 second or less when the flow rate is 20 to 50 sccm.

In the case where the build-down capacity BC=9.91 cc, flow rate output can be performed at intervals of approximately 1 second or less when the flow rate is 100 to 200 sccm.

TABLE 2

Pressure drop range: ΔP = 20 kPa abs.

| Build-down capacity BC: 1.78 cc | | Build-down capacity BC: 9.91 cc | |
|---|---|---|---|
| Flow rate (sccm) | Drop time (s) | Flow rate (sccm) | Drop time (s) |
| 5 | 4.22 | 50 | 2.35 |
| 10 | 2.11 | 100 | 1.17 |
| 20 | 1.05 | 200 | 0.59 |
| 50 | 0.42 | | |

Further, for confirmation of reproducibility, flow rate accuracies when measurements corresponding to FIG. 9 were repeatedly performed were investigated.

That is, flow rate calculation (3 points) was performed in the period from 0.5 to 1 second after the upstream side valve AV was closed. The flow rate computation was performed by using data until 0.5 seconds from the final point when the drop time is less than 1 second, or with respect to 50 sccm (BC=1.78) and 200 sccm (BC=9.91 cc), using the data (2 points) in 0.25 seconds.

FIG. 11 shows flow rate accuracy measured data when measurement was repeatedly performed (10 times), and shows that when the pressure drop time (b) is 0.5 seconds or less, as shown in FIG. 7, flow rate computation is performed within the nonlinear region of the pressure drop characteristic curve, therefore, the flow rate error tends to appear in the positive direction as shown in FIG. 11.

The flow rate Q by the build-down system has the relationship of Q=K×(pipe capacity×pressure drop rate×1/temperature) as is clear from the equation (1) given above. As a result, it is supposed that the pressure drop rate increases and the computed flow rate Q becomes constant even when a temperature drop is caused by adiabatic expansion according to a pressure change, however, in actuality, the computed flow rate increases. The supposed reason for this is that the gas temperature is measured on the body outer surface of the pressure type flow control system FCS, so that the temperature measured value is easily influenced by the room temperature, and in addition, the heat capacity of the temperature detection sensor is large although the heat capacity of the gas itself is small, and therefore, the gas temperature is not accurately measured.

The present invention was made based on the results of the respective tests described above, and the invention according to the first aspect is characterized in that a flow control system with build-down system flow monitoring includes an upstream side valve AV that opens/closes distribution of a gas from a gas supply source having a desired gas supply pressure, a flow control system with supply pressure fluctuation resistance connected to the downstream side of the upstream side valve AV, a build-down capacity BC being an internal volume of a passage communicatively connecting the outlet side of the upstream side valve AV and the flow control system inlet side, a temperature detection sensor T that detects the temperature of a gas distributed inside the passage forming the build-down capacity BC, a pressure sensor P that detects the pressure of the gas distributed inside the passage forming the build-down capacity BC, and a monitoring flow rate arithmetic and control unit CPb that controls opening/closing of the upstream side valve AV, and computes and outputs a monitoring flow rate Q by a build-down system by dropping the gas pressure to a set lower limit pressure value by closing the upstream side valve AV after a predetermined time of t seconds after setting the gas pressure inside the build-down capacity BC to a set upper limit pressure value by opening the upstream side valve AV, wherein the monitoring flow rate Q is computed by the following equation:

$$Q = \frac{1000}{760} \times 60 \times \frac{273}{(273+T)} \times V \times \frac{\Delta P}{\Delta t} \quad \text{[Numerical Equation 2]}$$

(Here, T is a gas temperature (° C.), V is a build-down capacity BC (l), ΔP is a pressure drop range (set upper limit pressure value–set lower limit pressure value) (Torr), Δt is a time (sec) from closing to opening of the upstream side valve AV).

The invention according to the second aspect is the invention according to the first aspect which is characterized in that the flow control system with supply pressure fluctuation resistance is a pressure type flow control system FCS including a control valve CV, an orifice OL or a critical nozzle, a pressure sensor $P_1$ and/or a pressure sensor $P_2$, and a flow rate arithmetic and control unit CPa, and the build-down capacity BC is the internal volume of a passage communicatively connecting the outlet side of the upstream side valve AV and the inlet side of the control valve CV of the pressure type flow control system.

The invention according to the third aspect is the invention according to the first or second aspect which is characterized in that the build-down capacity BC is set to 1.8 to 18 cc, the set upper limit pressure value is set to 400 to 200 kPa abs, the set lower limit pressure value is set to 350 kPa abs to 150 kPa abs, and the predetermined time t is set to be within 1 second.

The invention according to the fourth aspect is the invention according to the first or second aspect which is characterized in that the build-down capacity BC is set to 1.78 cc, the set upper limit pressure value is set to 370 kPa abs, the set lower limit pressure value is set to 350 kPa abs, the pressure difference ΔP is set to 20 kPa abs, and the predetermined time t is set to be within 1 second.

The invention according to the fifth aspect is the invention according to the first or second aspect which is characterized in that the upstream side valve AV is a fluid pressure-operated solenoid direct-mounting type motor-operated valve or solenoid direct-operated type motor-operated valve, and a recovery time of the gas pressure from the set lower limit pressure value to the set upper limit pressure value by opening of the upstream side valve AV by valve high-speed opening/closing is set to be much shorter than the gas pressure drop time from the set upper limit pressure value to the set lower limit pressure value by closing of the upstream side valve AV.

The invention according to the sixth aspect is the invention according to the first or second aspect which is characterized in that by inserting a bar piece to the inside of a gas flow passage between the outlet side of the upstream side valve AV and the flow control system, the passage sectional area of the gas flow passage is changed to adjust the build-down capacity BC and linearize the gas pressure drop characteristic.

The invention according to the seventh aspect is the invention according to the first or second aspect which is characterized in that a chamber with an appropriate internal capacity is interposed in a gas passage between the outlet side of the upstream side valve AV and the control valve of the flow control system FCS, and by changing the internal volume of the chamber, the value of the build-down capacity BC is adjusted.

The invention according to the eighth aspect is the invention according to the first or second aspect which is characterized in that the flow rate arithmetic and control unit CPa of the flow control system and the build-down monitoring flow rate arithmetic and control unit CPb are integrally formed.

The invention according to the ninth aspect is the invention according to the seventh aspect which is characterized in that the chamber is structured by concentrically disposing and fixing an inner cylinder and an outer cylinder, and the gap between the inner cylinder and the outer cylinder forming the chamber is used as a gas flow passage, and a pressure sensor $P_3$ is provided in the chamber.

The invention according to the tenth aspect is the invention according to the second aspect which is characterized in that a bar piece is inserted to the inside of the gas passage between the outlet side of the upstream side valve AV and the control valve of the pressure type flow control system FCS to change the passage sectional area of the gas flow passage.

The invention according to the eleventh aspect is the invention according to the second aspect which is characterized in that a chamber with an appropriate internal volume is interposed in the gas passage between the outlet side of the upstream side valve AV and the control valve of the pressure type flow control system FCS.

The invention according to the twelfth aspect is the invention according to the second aspect which is characterized in that the flow rate arithmetic and control unit CPa of the pressure type flow control system and the build-down monitoring flow rate arithmetic and control unit CPb are integrally formed.

The invention according to the thirteenth aspect is the invention according to the ninth aspect which is characterized in that a gas passage in which the gas is distributed upward from the lower side is provided inside the inner cylinder, and the gas is made to flow into the gap between the inner cylinder and the outer cylinder from the upper end surface of the inner cylinder.

The invention according to the fourteenth aspect is the invention according to the thirteenth aspect which is characterized in that the gas passage provided inside the inner cylinder is a gap $G_1$ formed between a longitudinal slot provided at the center portion of the inner cylinder and a columnar pin inserted inside the longitudinal slot.

The invention according to the fifteenth aspect is the invention according to the ninth aspect which is characterized in that the inner cylinder is an inner cylinder the outer peripheral surface of which is threaded.

The invention according to the sixteenth aspect is the invention according to the ninth aspect which is characterized in that the inner cylinder is an inner cylinder with slits inside of which the gas is distributed.

The invention according to the seventeenth aspect is the invention according to the ninth aspect which is characterized in that the inner cylinder is an inner cylinder provided with a filter medium inside of which the gas is distributed.

The invention according to the eighteenth aspect is the invention according to the ninth aspect which is characterized in that the inner cylinder is made of a filter medium or a porous ceramic material.

Effects of the Invention

In the invention according to the first aspect of the present application, an upstream side valve AV is provided on the upstream side of the flow control system, the flow passage between the upstream side valve AV and the flow control system is formed as a build-down capacity BC, and by utilizing high responsiveness of the flow control system to input side pressure fluctuation, a pressure drop ΔP corresponding to a gas pressure difference in a range in which the input side pressure fluctuation of the flow control system is allowed is caused once or more per second in the build-down capacity BC, and the pressure drop value (pressure difference ΔP), the pressure drop time (Δt), and the build-down capacity BC are set from the pressure drop rate ΔP/Δt, the build-down capacity BC, and the gas temperature K so that the monitoring flow rate can be computed and output at least once or more per second.

As a result, by setting the pressure drop value (pressure difference) ΔP to approximately 20 to 30 kPa abs, the pressure drop time Δt to 0.5 to 0.8 seconds, and the build-down capacity BC to 1.8 to 18 cc, the monitoring flow rate can be computed with high accuracy at least once or more per second and output, so that highly accurate flow monitoring closely approximating real-time monitoring is realized in spite of the use of the build-down system.

As compared with the conventional system including a combination with a thermal type flow sensor, the flow control system with monitoring can be significantly simplified in structure, downsized, and reduced in manufacturing cost, and the added value of the flow control system with monitoring is greatly improved.

DETAILED DESCRIPTION OF THE PREFERRED EMBODIMENTS

Hereinafter, an illustrative embodiment of the present invention is described based on each example with reference to the drawings.

First Example

Figure 12:
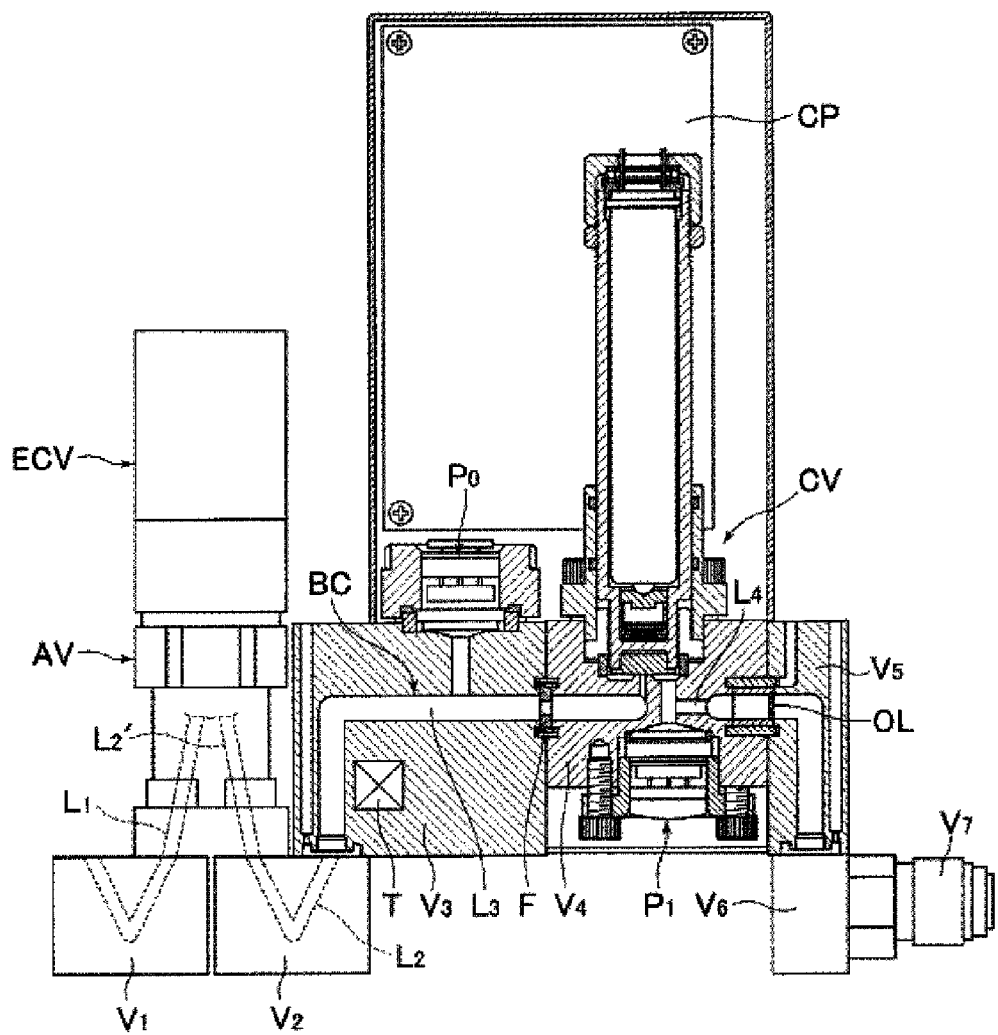
FIG. 12 is a schematic front view of a flow control system with build-down system flow monitoring according to a first illustrative example of the present invention.

FIG. 12 is a schematic front view of a flow control system with build-down system flow monitoring according to a first example of the present invention, and in FIG. 12, the reference symbol $P_1$ denotes a pressure sensor, OL denotes an orifice, CV denotes a control valve, $V_1$ and $V_2$ denote inlet side valve blocks, $V_3$, $V_4$, and $V_5$ denote FCS main body blocks, $V_6$ denotes an outlet side block, $V_7$ denotes a gas outlet joint, CP denotes an arithmetic and control unit, AV denotes an upstream side valve, $L_1$ denotes a gas inlet side flow passage of the upstream side valve, $L_2$ denotes a gas outlet side flow passage of the upstream side valve, $L_3$ denotes an inlet side passage of the control valve CV, $L_4$ denotes an outlet side passage of the control valve CV, $P_0$ denotes a pressure sensor on the upstream side of the control valve CV, T denotes a temperature detection sensor, and F denotes a filter.

The pressure type flow control system itself is known, therefore, detailed description thereof is omitted here. As a matter of course, the filter F can be omitted.

The arithmetic and control unit CP is formed by integrally combining a flow rate arithmetic and control unit CPa that controls opening/closing of the control valve CV of the pressure type flow control system FCS and computes a flow rate distributed through the orifice and a monitoring flow rate arithmetic and control unit CPb that computes the build-down system monitoring flow rate and controls opening/closing of the upstream side valve AV.

That is, the build-down system monitoring flow rate arithmetic and control unit CPb forming the essential portion of the present invention controls opening/closing of the upstream side valve AV, and computes and outputs a build-down system flow rate Q from the pressure sensor $P_0$, the temperature detection sensor T, and the builddown capacity BC consisting of the inlet side passage $L_2$ and the inlet side passage $L_3$.

As described above, in the arithmetic and control unit CP, the arithmetic and control unit CPa that performs flow rate computation and flow control of the pressure type flow control system FCS portion, and the arithmetic and control unit CPb that performs computation of the flow rate measured value Q of the build-down system flow monitoring unit, measurement of the pressure drop rate $\Delta P/\Delta t$, and opening/closing control of the upstream side valve AV, etc., are integrally provided, and by inputs of a command signal and/or a setting signal into the arithmetic and control unit CP, the flow control system with build-down system flow monitoring outputs a gas fluid the flow of which is controlled to a predetermined flow rate value, and this flow rate value is monitored and displayed at least once per second.

The structures and control methods of the pressure type flow control system FCS and the build-down system flow rate measuring unit are known, therefore, detailed descriptions thereof are omitted here.

When a difference equal to or more than a set value occurs between the monitoring flow rate output (flow rate output from the monitoring flow rate arithmetic and control unit CPb) and the flow rate output of the pressure type flow control system FCS (flow rate output from the pressure type flow rate arithmetic and control unit CPa), a flow rate abnormality warning can be issued, or if necessary, so-called flow rate self-diagnosis of the pressure type flow control system FCS can be performed to identify the cause and the location of the flow rate abnormality.

Further, when a flow rate difference equal to or more than the set value occurs, zero-point adjustment, etc., of the pressure type flow control system FCS can be automatically performed as well.

In the present first example, a direct-operated type solenoid driving valve is used as the upstream side valve AV, and the build-down capacity BC is selected in the range of 1.78 to 9.91 cc. Further, the pressure drop range $\Delta P$ is selected to be 20 kPa abs (350 to 320 kPa abs), and the monitoring flow rate is output at least once or more per second.

As the temperature detection sensor T, an outer surface-attaching type resistance temperature sensor is used, and it is also possible to use a thermostat type thermometer to be inserted into the body block $V_3$.

The flow passages $L_2'$, $L_2$, and $L_3$ forming the build-down capacity BC are formed to have inner diameters of 1.8 mm to 4.4 mm, and by appropriately selecting their inner diameters and flow passage lengths, a desired build-down capacity BC is obtained.

The build-down capacity BC may be adjusted by using a chamber with a pressure sensor as in the case of the third example described later.

Second Example

Figure 13:
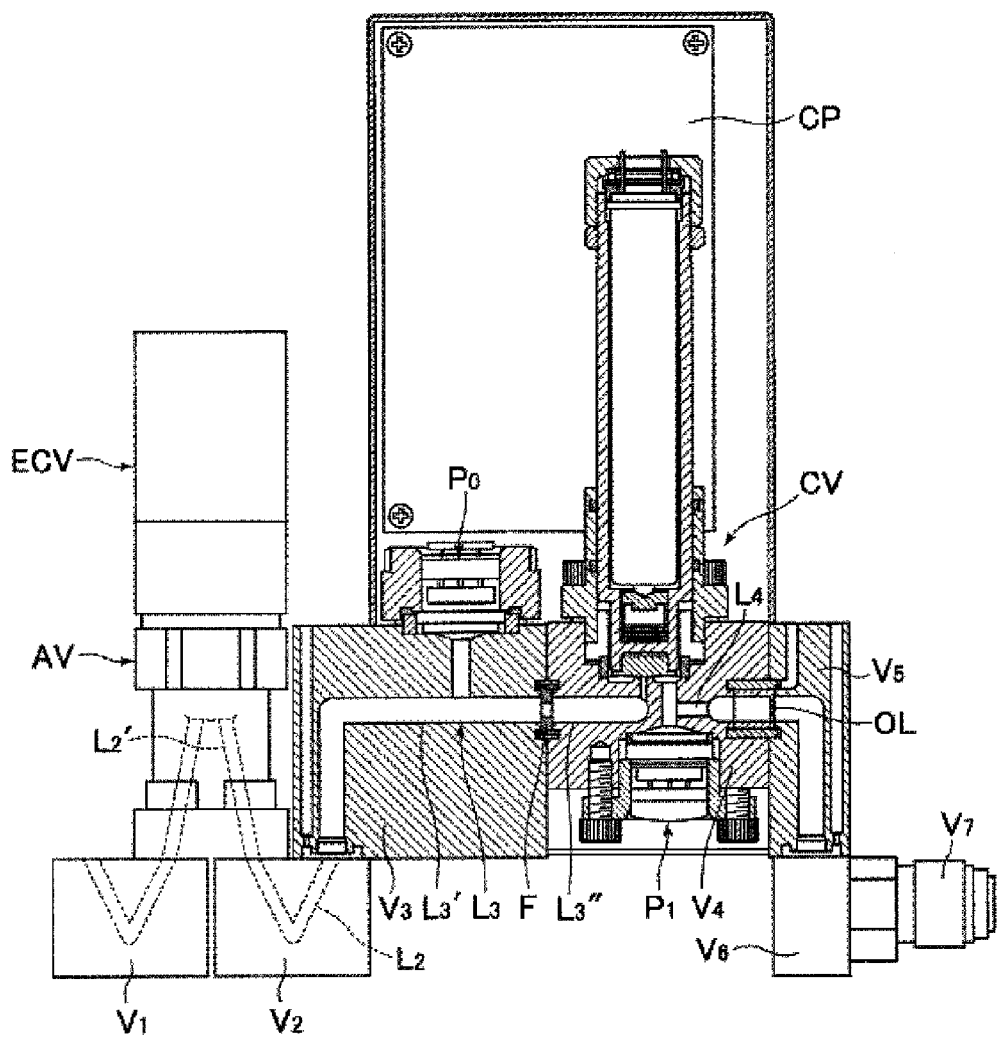
FIG. 13 is a schematic front view of a flow control system with build-down system flow monitoring according to a second illustrative example of the present invention.

FIG. 13 shows a second example of the present invention in which the flow passages $L_2'$, $L_2$, and $L_3$ forming the build-down capacity BC are formed to have inner diameters of 2.5 mm, 3.3 mm, and 4.4 mm, respectively, and a short bar piece, for example, a bar piece made of stainless steel is inserted into each flow passage $L_2'$, $L_2$, $L_3$ to simulatively narrow a part of the pipe inner diameter and adjust the total internal capacity BC to 1.78 to 9.91, and accordingly, the pressure drop characteristic is improved.

In FIG. 13, components except for the respective flow passages $L_2'$, $L_2$, and $L_3$ are the same as in FIG. 12 according to the first example described above.

Figure 14:
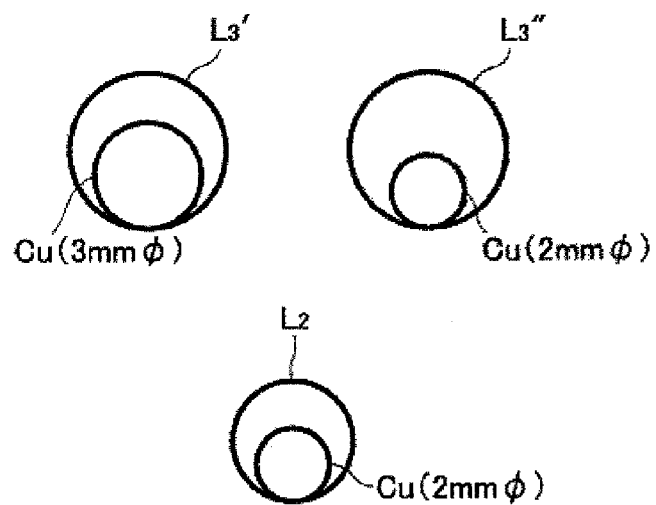
FIG. 14 is a cross sectional view showing a state where a bar piece Cu is inserted into a flow passage.

In this second example, a short bar piece (length: approximately 1 to 3 mm) Cu shown in FIG. 14 is inserted to an appropriate position inside each of the respective flow passages $L_2'$, $L_2$, and $L_3$, specifically, a bar piece with an outer diameter of 3 mm (or a bar piece with an outer diameter of 2 mm) is provided at a part of the flow passage $L_3$ with the inner diameter of 4.4 mm, or a bar piece Cu with an outer diameter of 2 mm is provided at the portion of the flow passage $L_2$.

Figure 15:
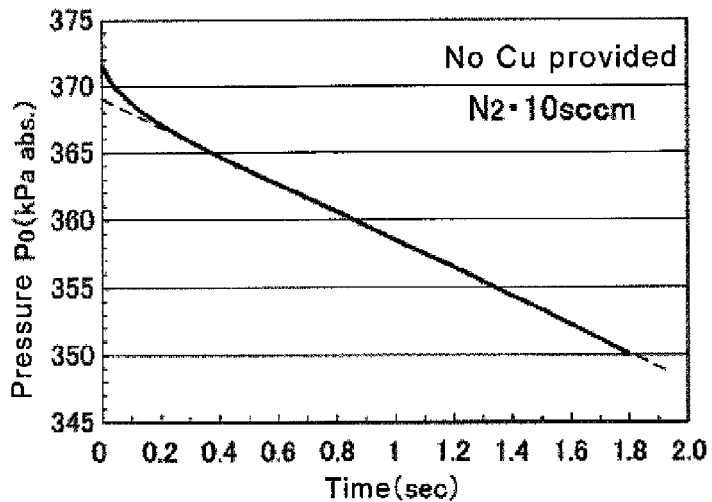
FIG. 15 is a pressure drop characteristic curve ($N_2$: 10 sccm) when no bar piece Cu is inserted.
Figure 16:
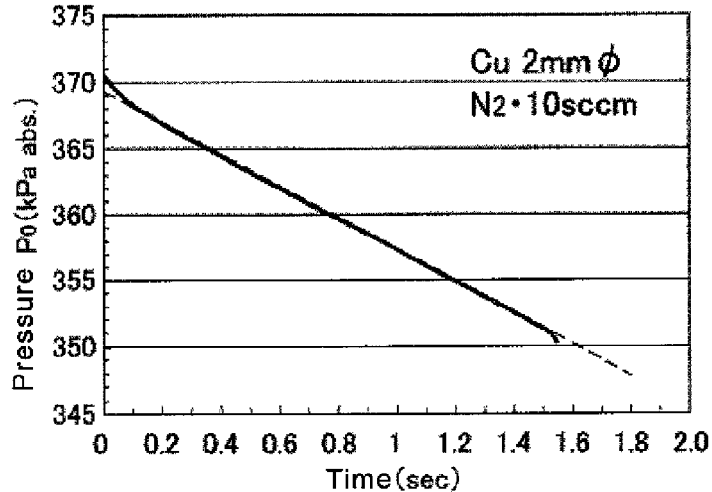
FIG. 16 is a pressure drop characteristic curve ($N_2$: 10 sccm) when a bar piece Cu with a diameter of 2 mm is inserted.
Figure 17:
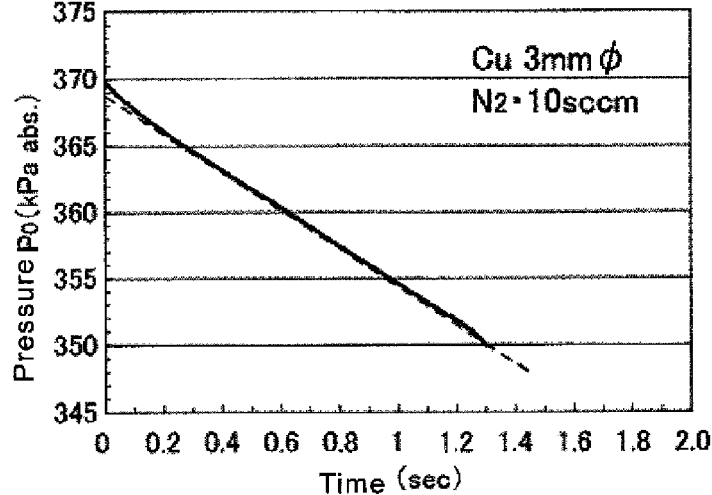
FIG. 17 is a pressure drop characteristic curve ($N_2$: 10 sccm) when a bar piece Cu with a diameter of 3 mm is inserted.

FIG. 15 to FIG. 17 show changed states of the pressure drop characteristic in the case where the bar piece Cu is inserted (the flow passage inner diameter is changed) when the gas is $N_2$, the flow rate is 10 sccm, the build-down capacity BC=1.78 cc, and the pressure drop ΔP is 20 kPa abs, and FIG. 15 shows the case where no bar piece Cu is provided (that is, under the same condition as in FIG. 8), FIG. 16 shows the case where a bar piece Cu with a diameter of 2 mm is inserted to one position, and FIG. 17 shows the case where a bar piece with a diameter of 3 mm is inserted to one position.

Figure 18:
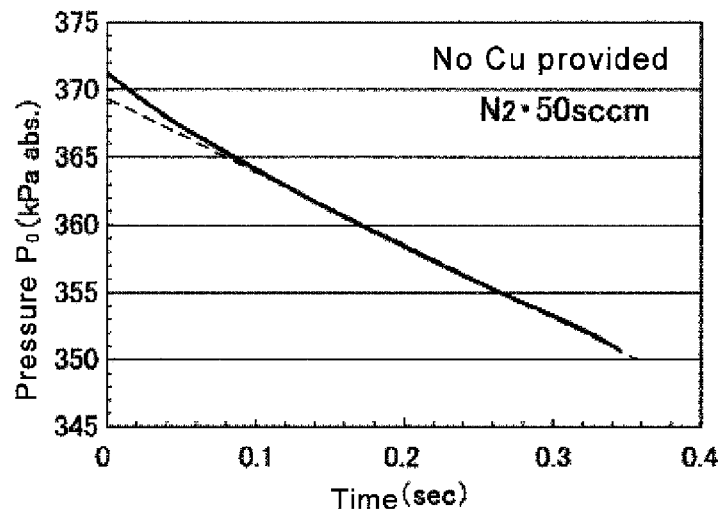
FIG. 18 is a pressure drop characteristic curve ($N_2$: 50 sccm) when no bar piece Cu is inserted.
Figure 19:
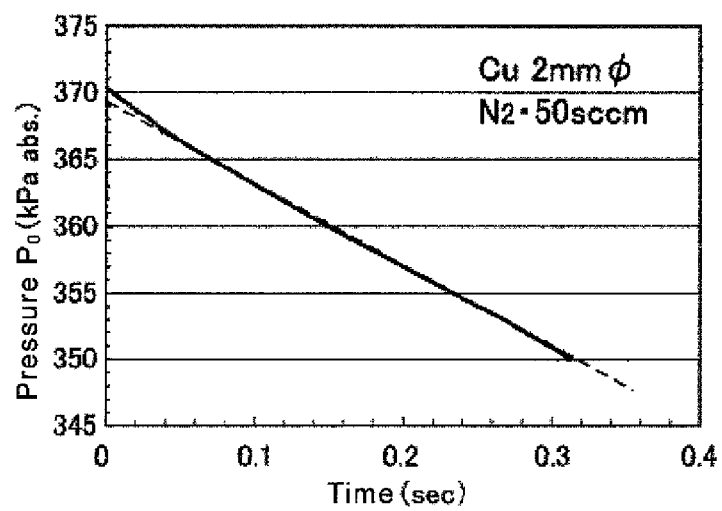
FIG. 19 is a pressure drop characteristic curve ($N_2$: 50 sccm) when a bar piece Cu with a diameter of 2 mm is inserted.
Figure 20:
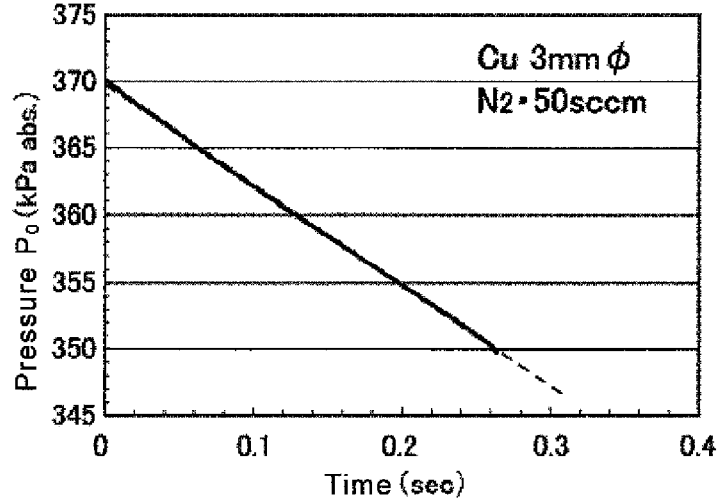
FIG. 20 is a pressure drop characteristic curve ($N_2$: 50 sccm) when a bar piece Cu with a diameter of 3 mm is inserted.
Figure 21:
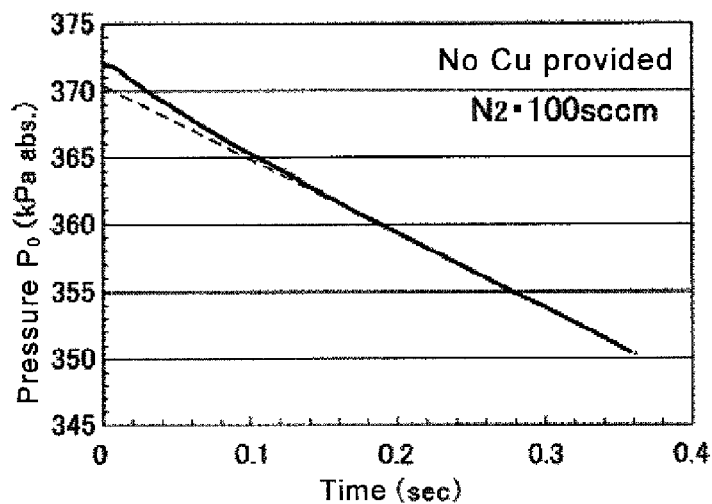
FIG. 21 is a pressure drop characteristic curve ($N_2$: 100 sccm) when no bar piece Cu is inserted.
Figure 22:
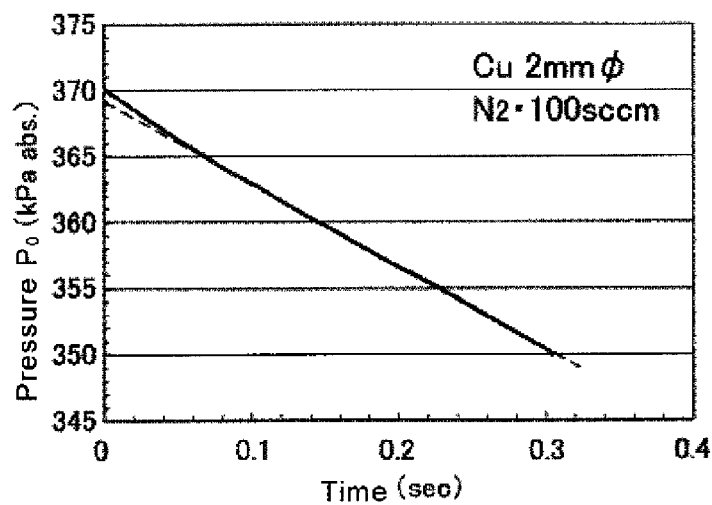
FIG. 22 is a pressure drop characteristic curve ($N_2$: 100 sccm) when a bar piece Cu with a diameter of 2 mm is inserted.
Figure 23:
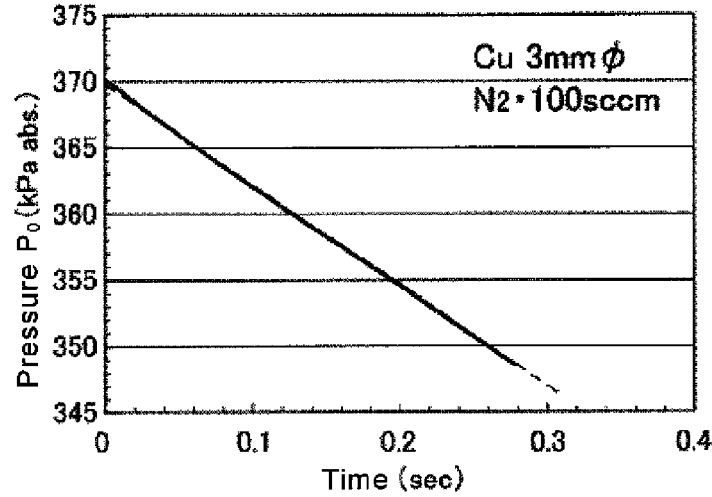
FIG. 23 is a pressure drop characteristic curve ($N_2$: 100 sccm) when a bar piece Cu with a diameter of 3 mm is inserted.

FIG. 18 to FIG. 20 show the pressure drop characteristic under the same state as in FIG. 15 to FIG. 17 when the flow rate of the $N_2$ gas is set to 50 sccm, and further, FIG. 21 to FIG. 23 show the pressure drop characteristic when the $N_2$ gas flow rate is set to 100 sccm.

Figure 9:
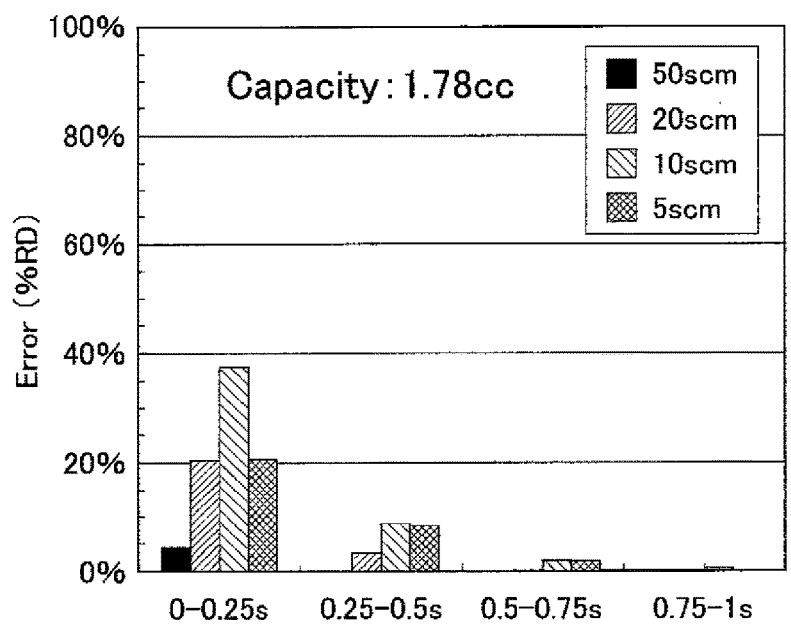
FIG. 9 is a diagrammatic drawing showing a relationship between an elapsed time from closing of the upstream side valve AV and flow rate stability (build-down capacity BC=1.78 cc).
Figure 10:
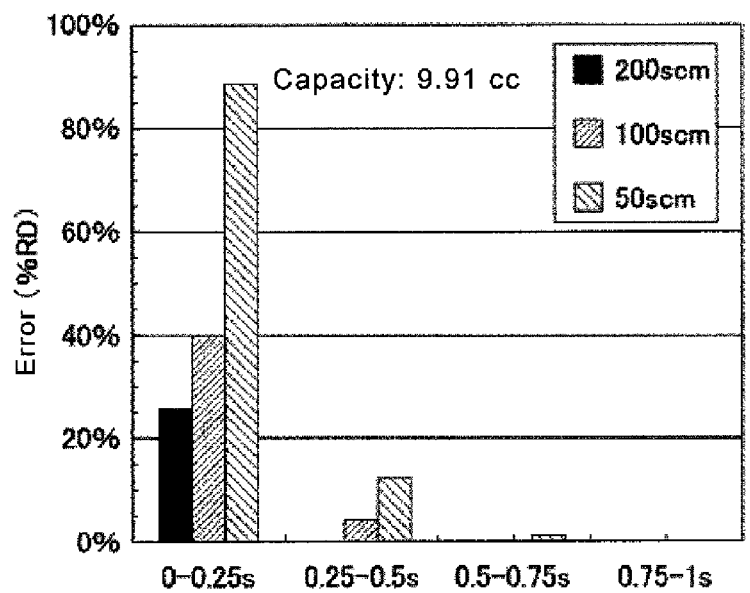
FIG. 10 is a diagrammatic drawing showing a relationship between an elapsed time from closing of the upstream side valve AV and flow rate stability (build-down capacity BC=9.91 cc).
Figure 11:
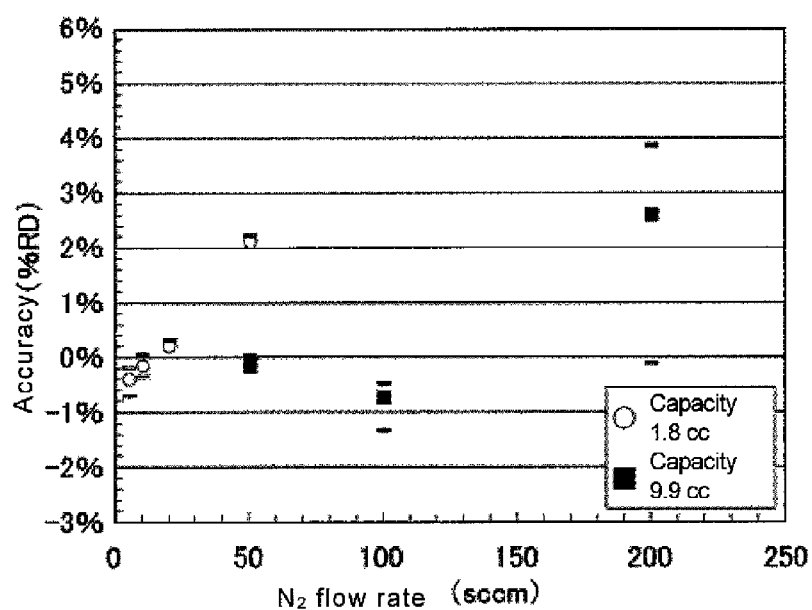
FIG. 11 is a diagram showing flow rate accuracy at 10-times repeated measurement.

As is clear from comparison among FIG. 15, FIG. 16 and FIG. 17, among FIG. 18, FIG. 19 and FIG. 20, and among FIG. 21, FIG. 22 and FIG. 23, in the second example, linearity of the pressure drop characteristic is significantly improved by using the bar piece Cu, and as a result, the flow rate stabilization time from closing of the upstream side valve AV shown in FIG. 9 and FIG. 10 is shortened, and the flow rate accuracy shown in FIG. 11 is also significantly improved.

Figure 24:
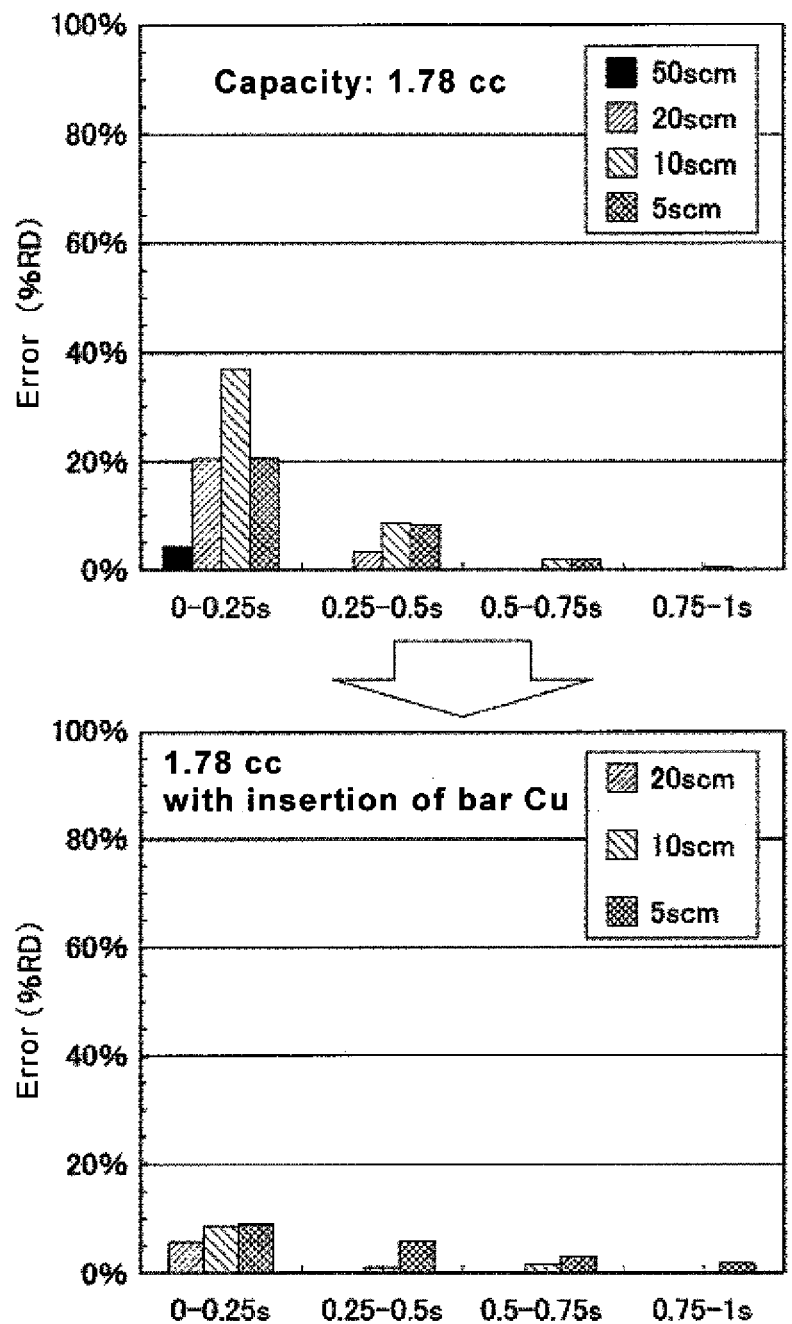
FIG. 24 is a diagrammatic drawing showing a changed state of the flow rate stabilization time when a bar piece Cu is used (build-down capacity BC=1.78 cc).
Figure 25:
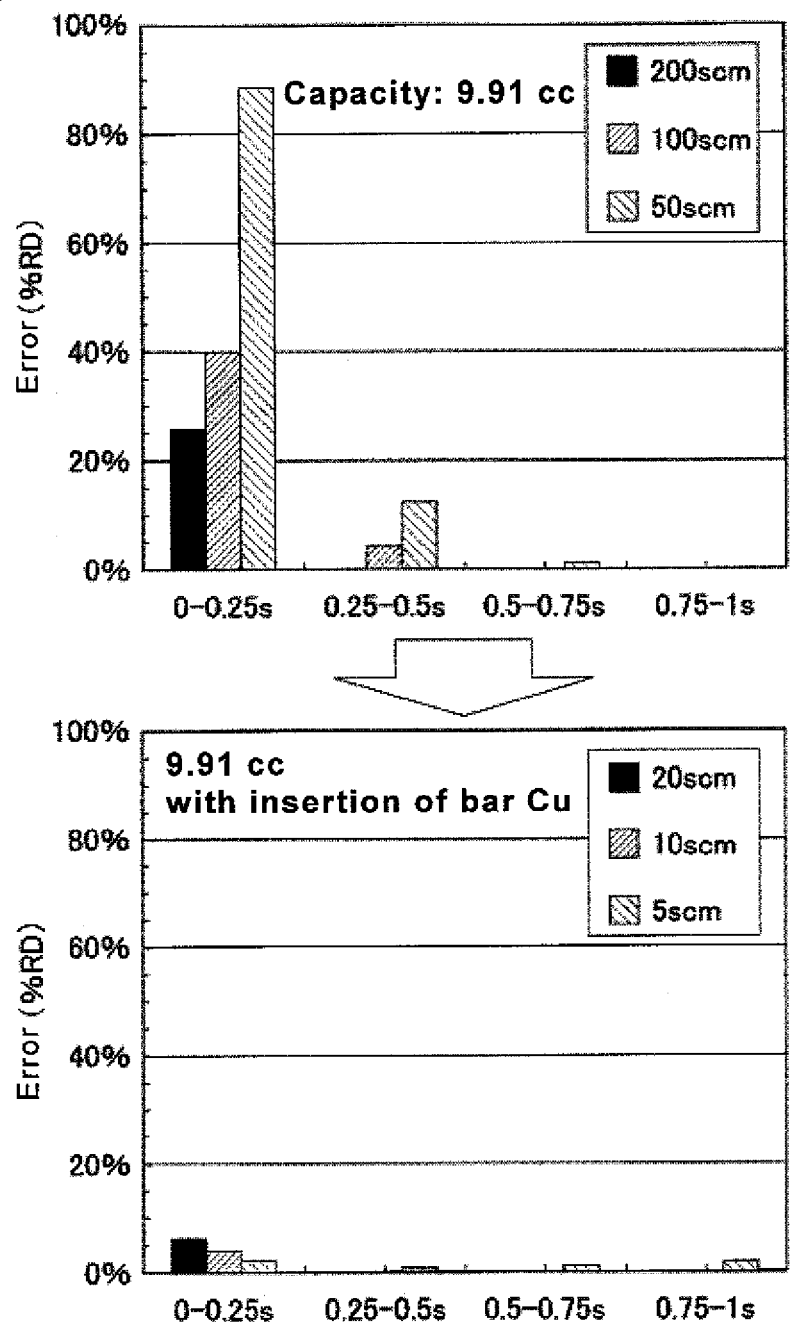
FIG. 25 is a diagrammatic drawing showing a changed state of the flow rate stabilization time when a bar piece Cu is used (build-down capacity BC=9.91 cc).

FIG. 24 and FIG. 25 show changes in flow rate errors relating to the flow rate stabilization time shown in FIG. 9 and FIG. 10 when the bar piece Cu is used, and in both of the cases where the build-down capacity BC is 1.79 cc and 9.91 cc, errors can be significantly reduced, that is, the flow rate stabilization time can be shortened and the flow rate detection time can be increased.

Third Example

Figure 26:
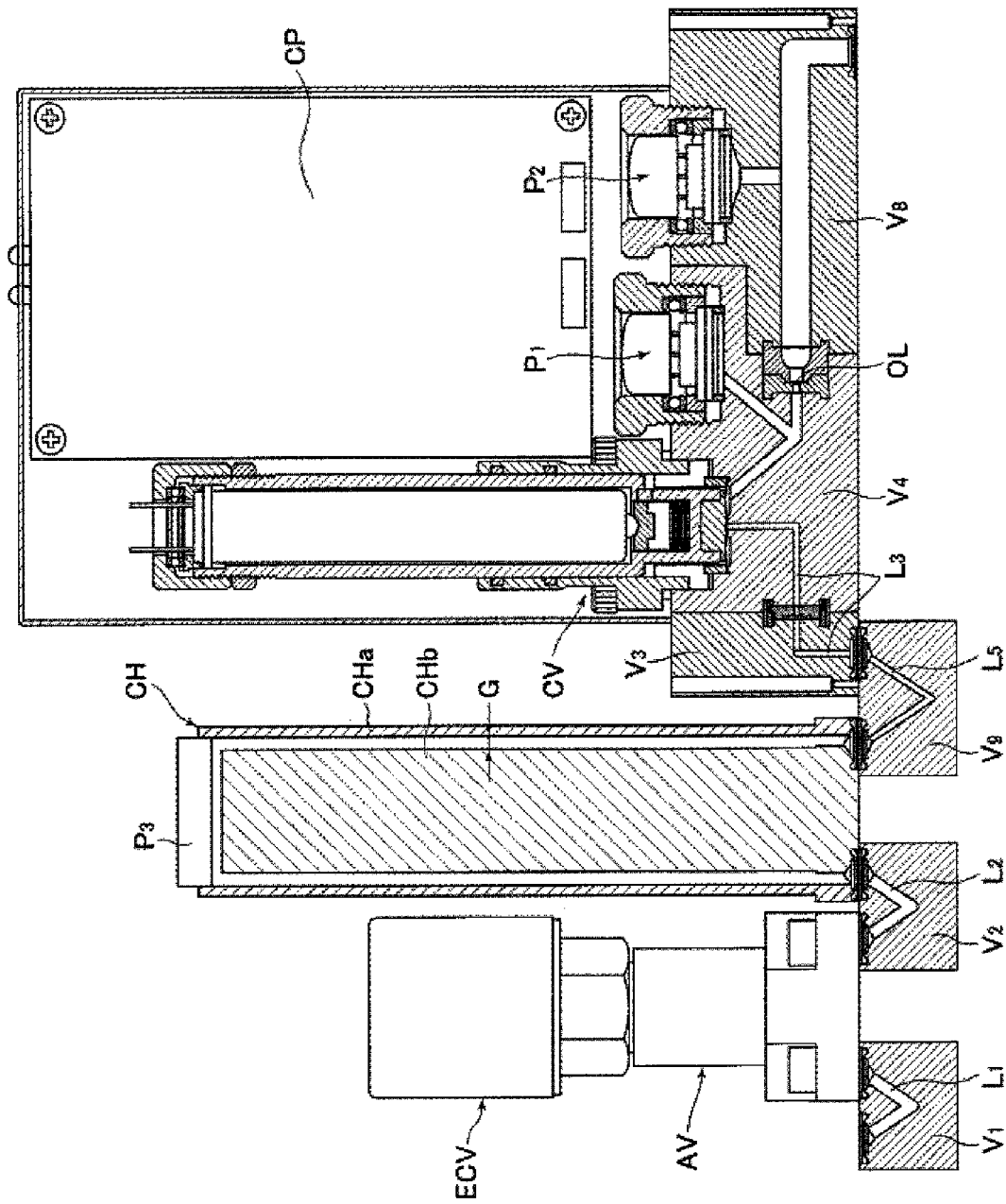
FIG. 26 is a structural diagram of a flow control system with build-down system flow monitoring according to a third illustrative example of the present invention.

FIG. 26 is a basic constitution diagram of a flow control system with build-down system flow monitoring according to a third example of the present invention. Major differences between this third example and the flow control systems with build-down system flow monitoring according to the first and second examples described above are that a chamber CH with a pressure sensor is used for forming the build-down capacity BC, the inner diameters of the respective gas passages $L_2$, $L_3$, and $L_5$ are set to small diameters of 1.8 mm, a pressure sensor $P_2$ is separately provided on the downstream side of the orifice, and the chamber CH is provided with a pressure sensor $P_3$, etc., and the constitutions of the other members are substantially the same as in the first and second examples.

That is, in this third example, a small-sized pressure chamber CH is provided between the upstream side valve AV and the control valve CV of the pressure type flow control system FCS, and by adjusting the internal volume of the pressure chamber CH, the build-down capacity BC is adjusted.

This pressure chamber CH is formed into a double cylinder consisting of an outer cylinder CHa and an inner cylinder CHb, and a gap G between the inner and outer cylinders CHa and CHb is selected to be 1.8 mm in the present embodiment.

The internal volume of the pressure chamber CH is selected to be approximately 1.3 to 12 cc, and the pressure sensor $P_3$ is attached to this pressure chamber CH.

In FIG. 26, the reference symbol $V_6$ denotes a chamber outlet side block, and $P_1$, $P_2$, and $P_3$ denote pressure sensors.

In this third example, the volume of the pressure chamber CH can freely be selected, and the gas flow passages $L_5$ and $L_3$, etc., can be formed to have the same small diameter (for example, a diameter of 1.8 mm), so that the build-down capacity BC can be accurately and easily set to a predetermined capacity value.

Figure 1:
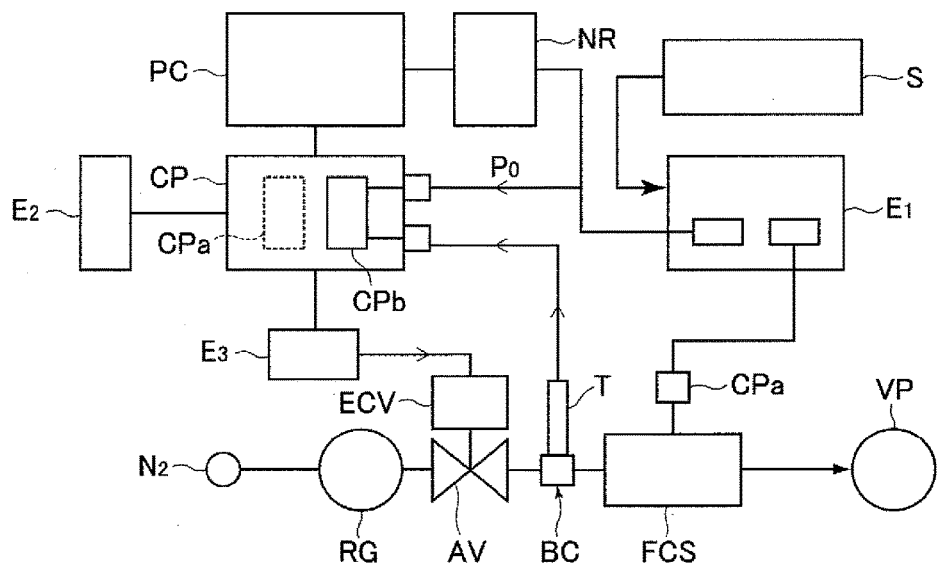
FIG. 1 is a schematic structural diagram of test equipment for measuring flow monitoring characteristics of a flow control system with build-down system flow monitoring according to an embodiment of the present invention.

In detail, as a chamber CH for testing, five kinds of chambers having the gaps G set to 1.8 mm and 3.6 mm and sized as shown in Table 3 were prepared, and the system shown in FIG. 26 using these chambers was applied to the test equipment shown in FIG. 1 and the relationship, etc., among the gas flow rate (sccm), the pressure drop gradient (kPa/sec), and the pressure drop time (sec), etc., was investigated.

In the investigation using the test equipment shown in FIG. 1, the temperature detection sensor T was attached and fixed to the outer surface of the chamber CH. The volume of the gas flow passages $L_3$ and $L_5$ other than the chamber CH is 0.226 cc.

TABLE 3

| Chamber A | | | Chamber B | | | Chamber C | | |
|---|---|---|---|---|---|---|---|---|
| Gap | 1.8 | mm | Gap | 1.8 | mm | Gap | 2.4 | mm |
| Height | 14.0 | mm | Height | 92.0 | mm | Height | 92.0 | mm |
| Diameter | 18.0 | mm | Diameter | 18.0 | mm | Diameter | 18.0 | mm |
| Chamber | 1.58 | cc | Chamber | 8.72 | cc | Chamber | 11.15 | cc |
| Other flow passage volume | 0.226 | cc | Other flow passage volume | 0.226 | cc | Other flow passage volume | 0.226 | cc |
| Actual total | 2.31 | cc | Actual total | 9.70 | cc | Actual total | 11.55 | cc |

TABLE 3-continued

| | volume | | | volume | | | volume | |
|---|---|---|---|---|---|---|---|---|
| | | Chamber D | | | | Chamber E | | |
| Gap | 3.0 | mm | | Gap | 3.6 | mm | | |
| Height | 92.0 | mm | | Height | 92.0 | mm | | |
| Diameter | 18.0 | mm | | Diameter | 18.0 | mm | | |
| Chamber | 13.35 | cc | | Chamber | 15.31 | cc | | |
| Other flow passage volume | 0.226 | cc | | Other flow passage volume | 0.226 | cc | | |
| Actual total volume | 13.91 | cc | | Actual total volume | 15.45 | cc | | |

Figure 2:
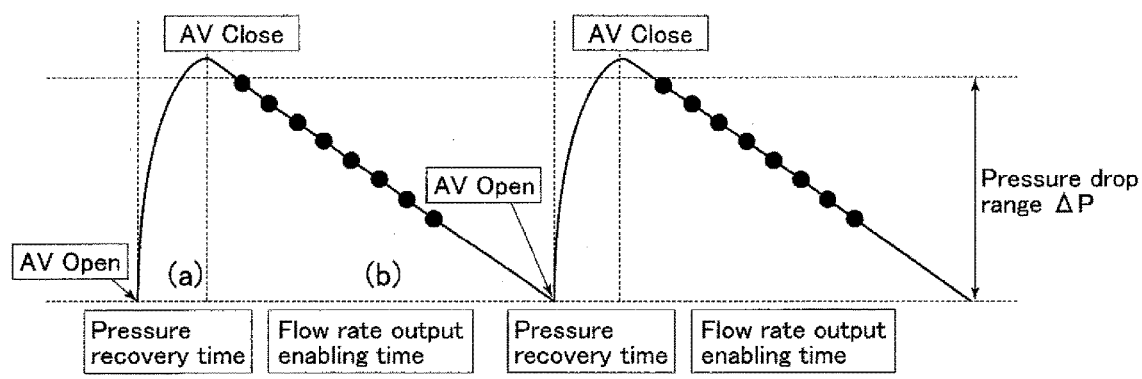
FIG. 2 is an explanatory view of a pressure drop state of build-down system flow monitoring.
Figure 3:
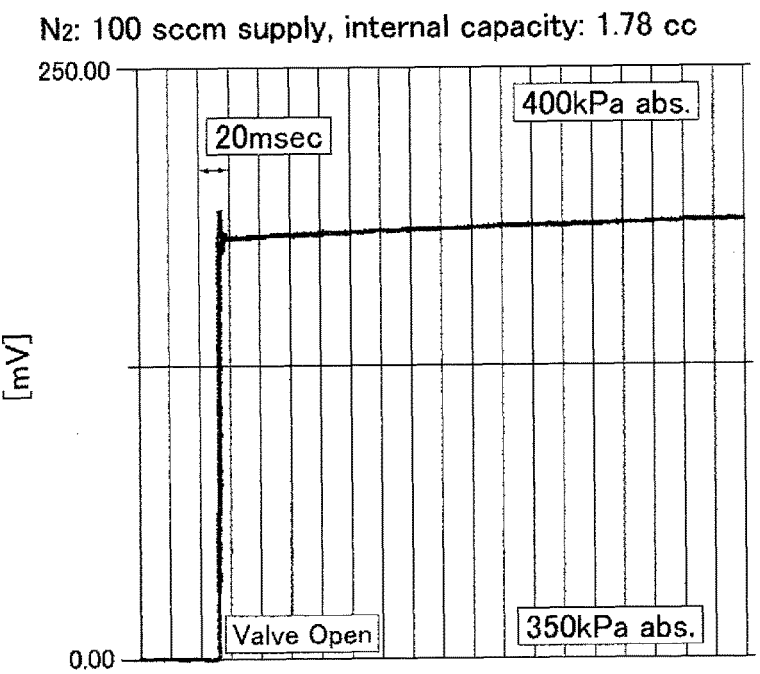
FIG. 3 is a diagram showing an example of a pressure recovery characteristic curve at the time of build-down system flow rate measurement.
Figure 4:
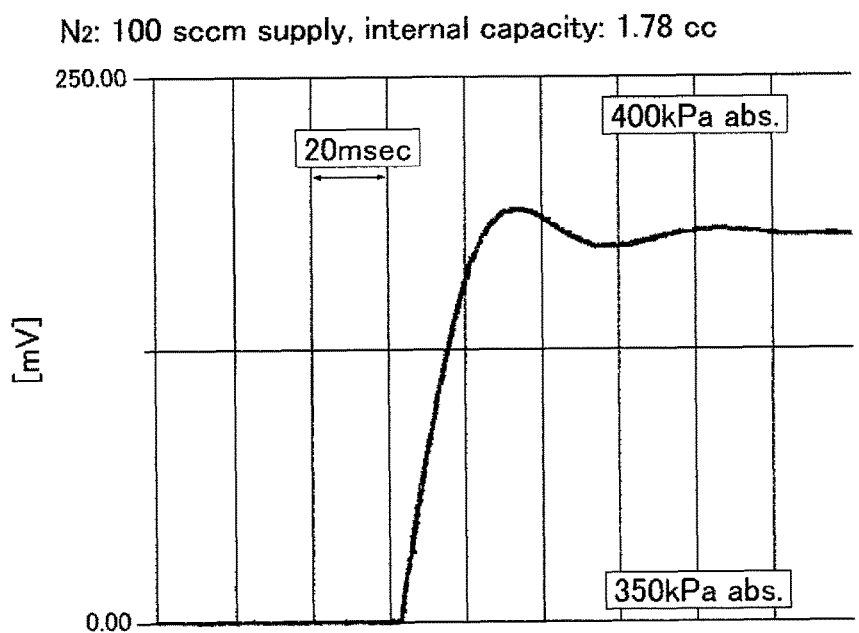
FIG. 4 is a partial enlarged view of FIG. 4.
Figure 5:
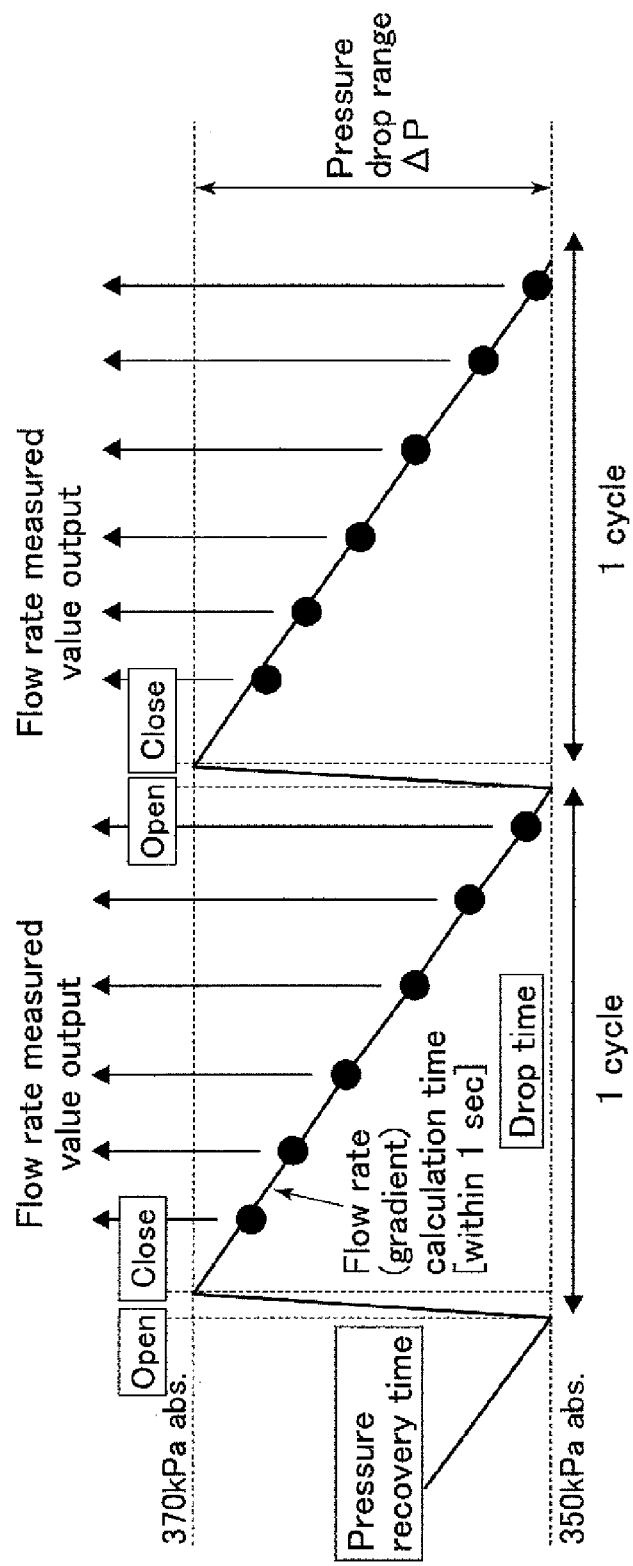
FIG. 5 is a diagram showing a pressure recovery characteristic curve in Test 1.
Figure 27:
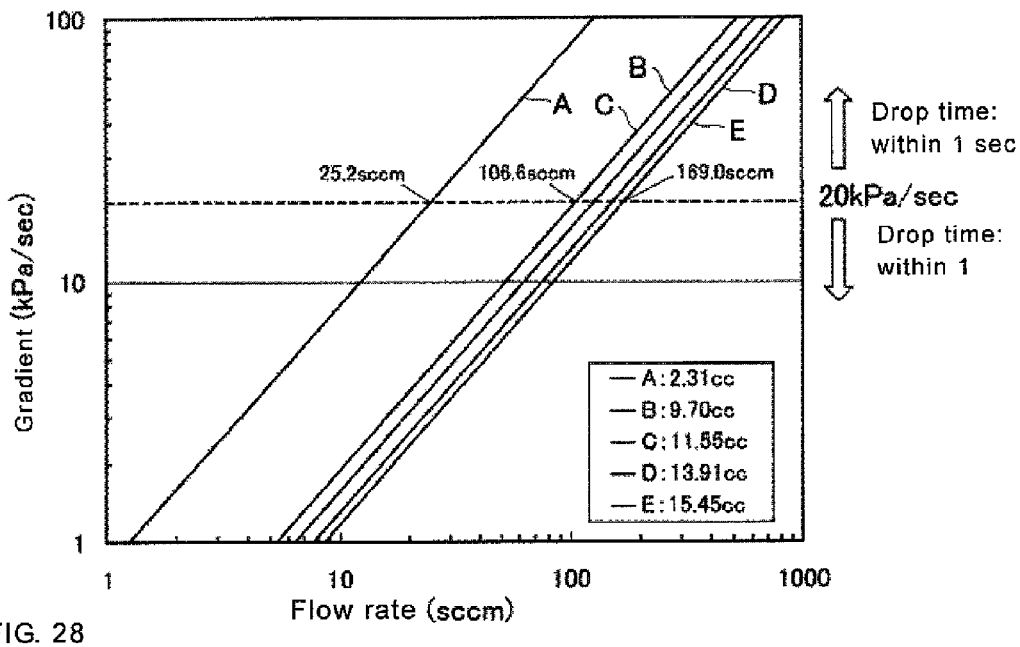
FIG. 27 is a diagrammatic drawing showing a relationship between the gas flow rate (sccm) and the pressure drop gradient (kPa/sec) in a case where the measurement enabling time is set to 1 second or less in each of the chambers A to E used in the third illustrative example.

FIG. 27 shows the results of measurement of the relationship between the gas flow rate (sccm) and the pressure drop gradient (kPa/sec) in each case of using the chambers A to E when the pressure drop time (b) in FIG. 2 was set to be within 1 second, and although the volume of the flow passages $L_5$ and $L_3$ of the pressure type flow control system FCS, etc., shown in FIG. 26 was selected to be 0.226 cc as described above, each of the actual build-down capacities in FIG. 26 in the state where the system was assembled to the test equipment were 2.31 cc to 15.45 cc.

As is also clear from FIG. 27, when the pressure drop range ΔP is set to 20 kPa/sec, in the case of the chamber A, the flow rate of 25.2 sccm can be measured, in the case of the chamber B, 106.6 sccm can be measured, and in the case of the chamber E, 169.0 sccm can be measured.

Figure 6:
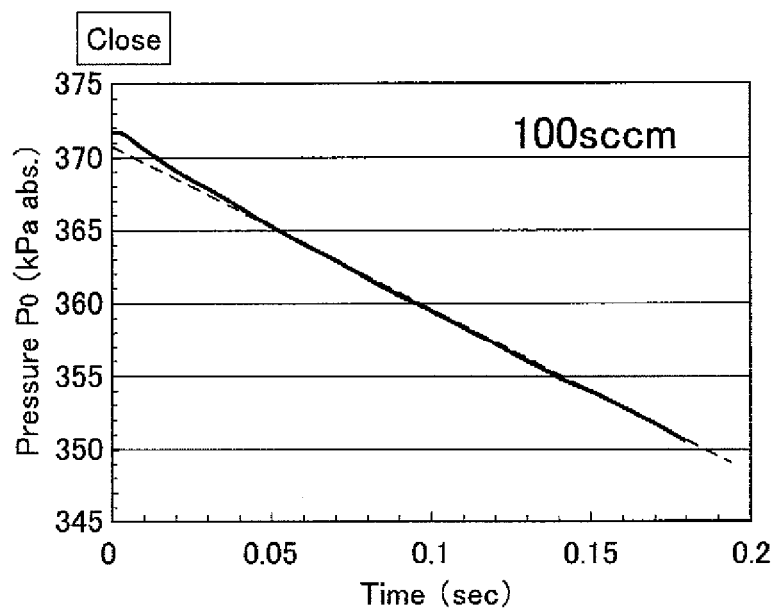
FIG. 6 is a diagram showing a pattern of the pressure drop characteristic (controlled flow rate=100 sccm).
Figure 7:
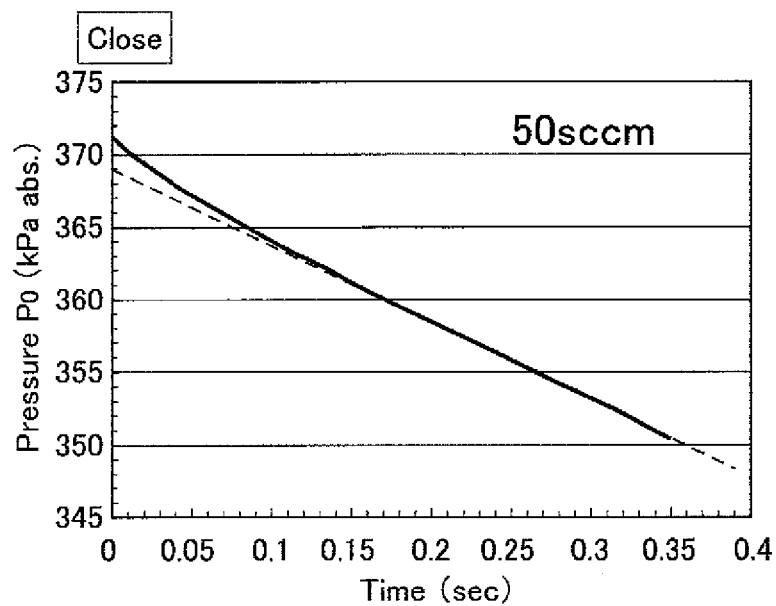
FIG. 7 is a diagram showing a pattern of the pressure drop characteristic (controlled flow rate=50 sccm).
Figure 8:
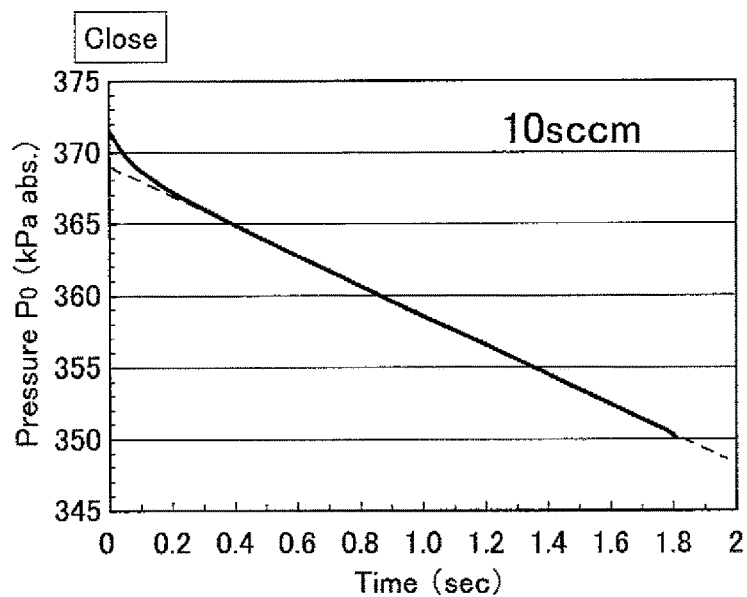
FIG. 8 is a diagram showing a pattern of the pressure drop characteristic (controlled flow rate=10 sccm).
Figure 28:
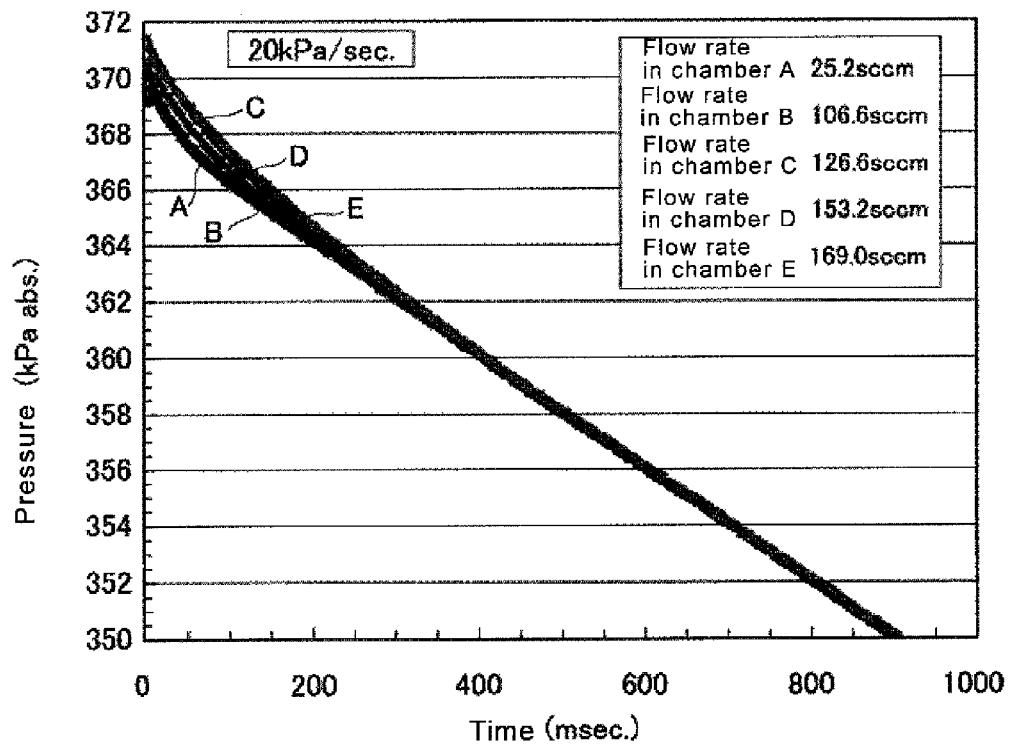
FIG. 28 is a diagram showing a pattern of the pressure drop characteristic when the pressure drop gradient is 20 kPa/sec in each of the chambers A to E used in the third example.

FIG. 28 is a diagrammatic drawing similar to FIG. 6 to FIG. 8, showing linearity of the pressure drop when the gas flow rate was adjusted so that the pressure drop gradient reached 20 kPa/sec in the test equipment shown in FIG. 1. The measured data were acquired by the data logger NR shown in FIG. 1.

As is clear from FIG. 28, the smaller the build-down capacity BC of the chamber CH (that is, the chamber A, B, etc.) is, the more excellent the linearity of the pressure drop characteristic.

Figure 29:
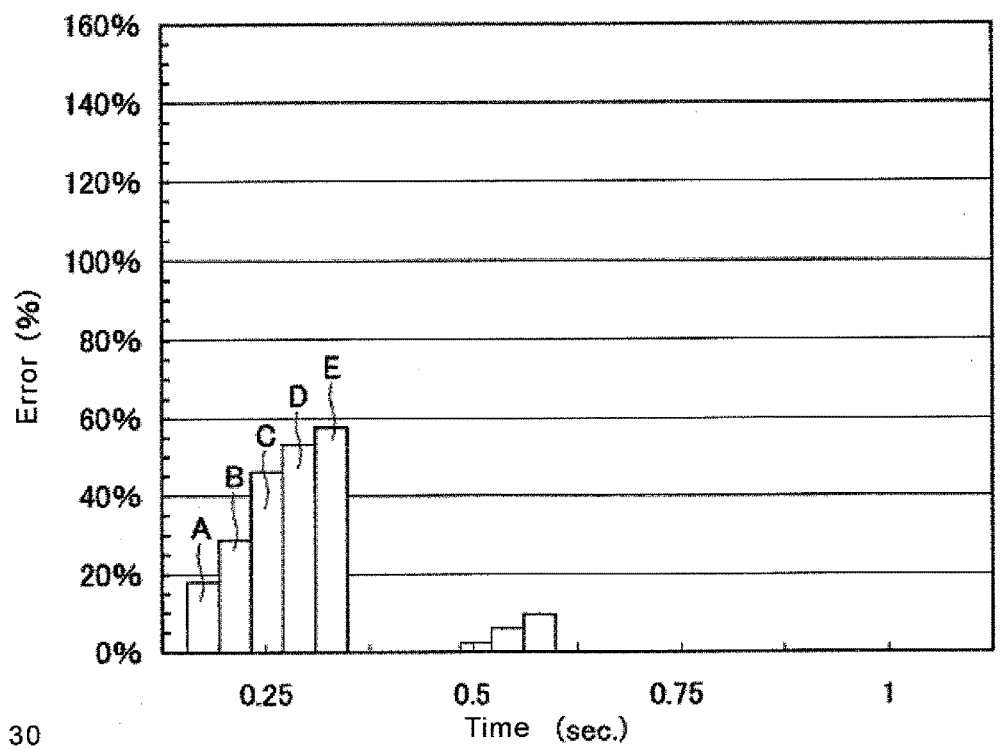
FIG. 29 is a diagrammatic drawing showing a relationship between an elapsed time from closing of the upstream side valve AV and the flow rate stability of each of the chambers A to E used in the third illustrative example.

FIG. 29 shows the results of obtaining flow rate measurement errors caused by deviations from the linearity of the pressure drop characteristic curve by measuring 5 points every 0.25 seconds within the flow rate measurement enabling time (b) within 1 second as in the case of FIG. 9 and FIG. 10, and proves that the smaller the build-up capacity BC of the chamber A, B, the earlier the flow rate error decreases from the start of the pressure drop (that is, the more excellent in linearity of the pressure drop characteristic).

Figure 30:
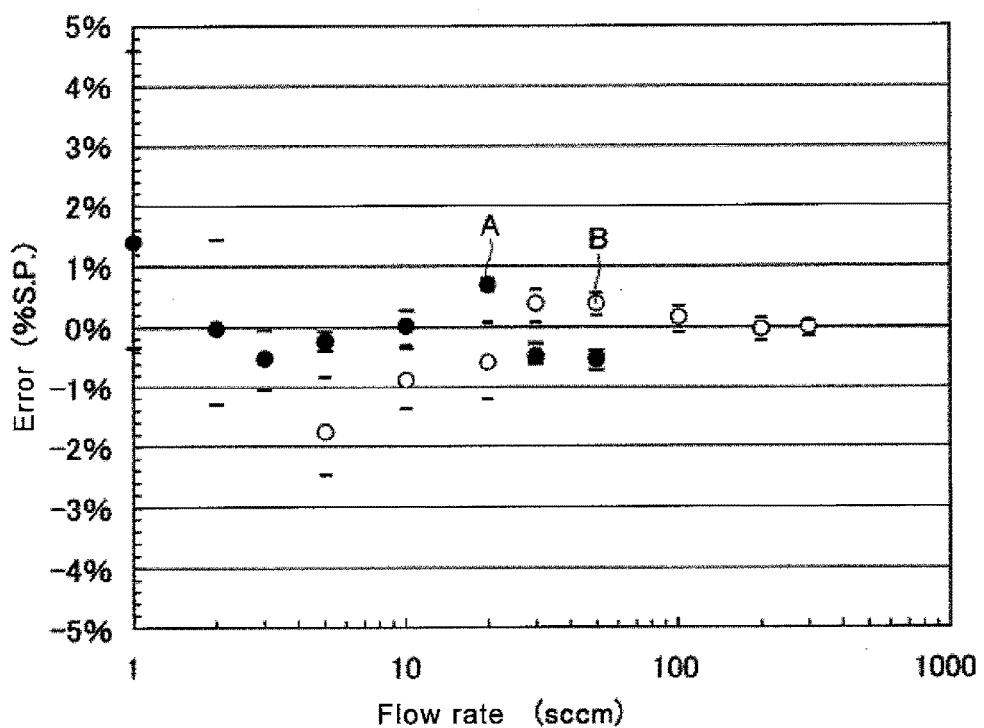
FIG. 30 is a diagrammatic drawing showing a relationship between flow rate accuracy (% S.P.) and the flow rate (sccm) in repeated measurements in the chamber A and the chamber B used in the third illustrative example.

FIG. 30 shows the results of investigation on the reproducibility of the flow rate measurement accuracy by using the chamber A and the chamber B, and the investigation was performed for the same purpose as in the case of FIG. 11.

In this flow rate measurement accuracy reproducibility test, to stabilize the pressure drop gradient, the measurement was performed after a predetermined waiting time from closing of the upstream side valve AV, and the measurement was performed for a long period of time to obtain the reproducibility, however, the flow rate output time was set to be within 1 second in each case.

As is also clear from FIG. 30, in view of reproducibility, the flow rate of 3 to 50 sccm is the applicable range in the case of the chamber A, and 30 to 300 sccm is the applicable range in the case of the chamber B.

Table 4 shows basic data used for preparing the diagrammatic drawing showing reproducibility of the flow rate measurement accuracy shown in FIG. 30, and the chamber A (build-down capacity BC=2.31 cc) and the chamber B (build-down capacity BC=9.47 cc) are set as test objects.

TABLE 4

| Chamber A (BC = 2.31 cc) | | | | | | | | | |
|---|---|---|---|---|---|---|---|---|---|
| Flow rate | sccm | 1 | 2 | 3 | 5 | 10 | 20 | 30 | 50 |
| Temperature | ° C. | 22.7 | 23.0 | 23.1 | 22.8 | 22.6 | 22.6 | 22.6 | 22.7 |
| Gradient | kPa/sec | 0.8 | 1.6 | 2.4 | 4.0 | 7.9 | 16.1 | 23.4 | 39.2 |
| Measurement start pressure | kPa abs. | 370 | 370 | 370 | 370 | 370 | 370 | 370 | 370 |
| Measurement end pressure | kPa abs. | 368 | 365 | 365 | 363 | 355 | 350 | 350 | 350 |
| Measurement pressure range: P | kPa | 2 | 5 | 5 | 7 | 15 | 20 | 20 | 20 |
| Measurement time: t | sec | 2.73 | 3.42 | 2.28 | 1.91 | 2.05 | 1.37 | 0.91 | 0.55 |

| Chamber B (BC = 9.47 cc) | | | | | | | | | |
|---|---|---|---|---|---|---|---|---|---|
| Flow rate | sccm | 5 | 10 | 20 | 30 | 50 | 100 | 200 | 300 | 400 |
| Temperature | ° C. | 22.7 | 23.0 | 22.4 | 22.4 | 22.5 | 22.5 | 22.5 | 22.6 | 22.59 |
| Gradient | kPa/sec | 0.9 | 1.9 | 3.8 | 5.7 | 9.4 | 18.9 | 37.7 | 57.3 | 77.204 |
| Measurement start pressure | kPa abs. | 370 | 370 | 370 | 370 | 370 | 370 | 370 | 370 | |

TABLE 4-continued

| | | | | | | | | | | |
|---|---|---|---|---|---|---|---|---|---|---|
| Measurement end pressure | kPa abs. | 368 | 367 | 365 | 360 | 350 | 350 | 350 | 350 | 350 |
| Measurement pressure range: P | kPa | 2 | 3 | 5 | 10 | 20 | 20 | 20 | 20 | 20 |
| Measurement time: t | sec | 2.24 | 1.68 | 1.40 | 1.87 | 2.24 | 1.12 | 0.56 | 0.37 | 0.28 |

* Measured by changing the time and pressure range so as not to exceed 10,000 data.

Figure 31:
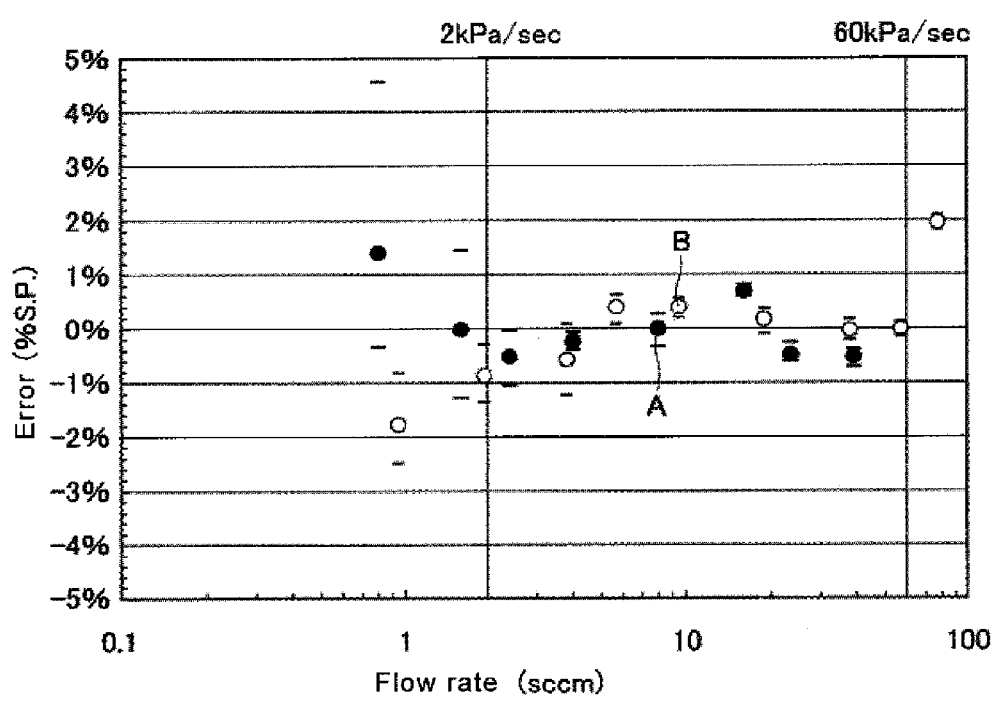
FIG. 31 is a diagrammatic drawing showing a relationship between flow rate accuracy (% S.P.) and the pressure drop gradient (kPa/sec) in repeated measurements in the chamber A and the chamber B used in the third example.

FIG. 31 shows the results of investigation on the relationship between the pressure drop gradient (kPa/sec) and the error (% S.P.) of the chamber A and the chamber B from the data shown in Table 4 above, and proves that the flow rate measurement error (% S.P.) is within the range of ±1% as long as the pressure drop gradient is in the range of 2 to 60 kPa/sec.

Figure 32:
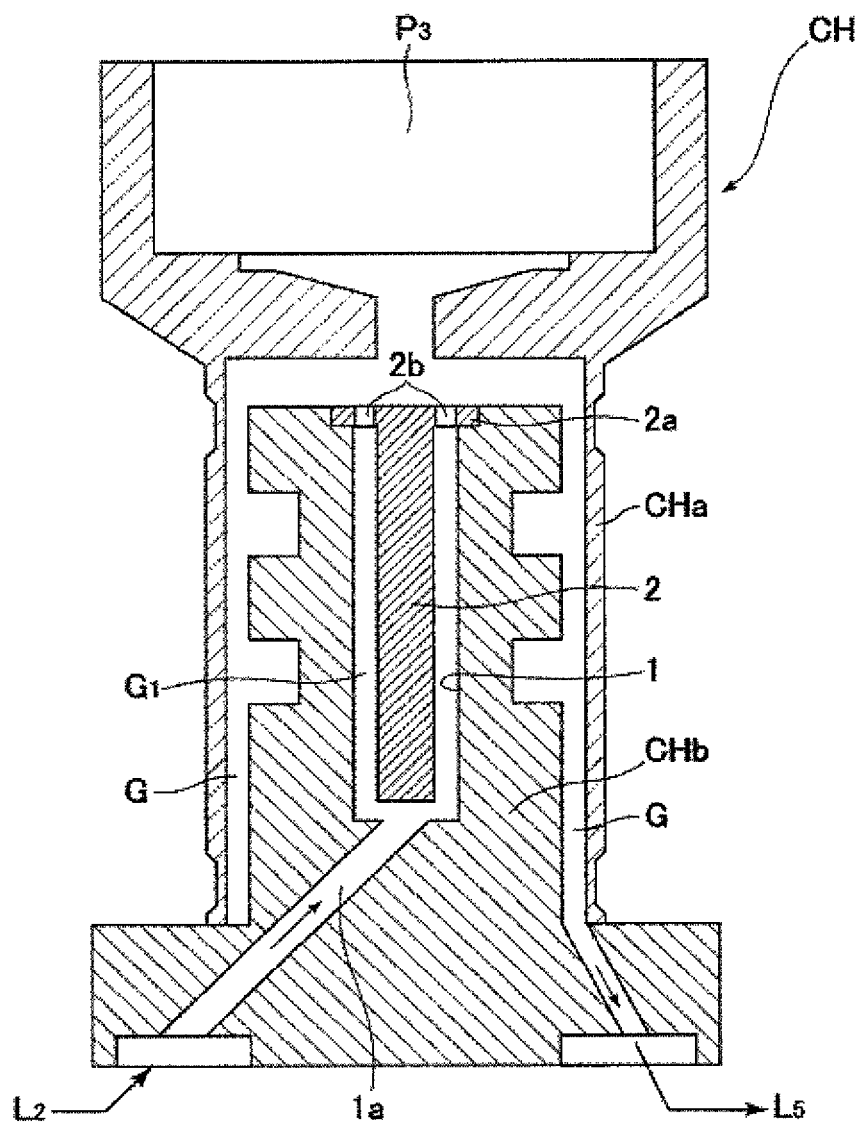
FIG. 32 is a longitudinal sectional view showing a second instance of the chamber used in the third illustrative example.
Figure 33:
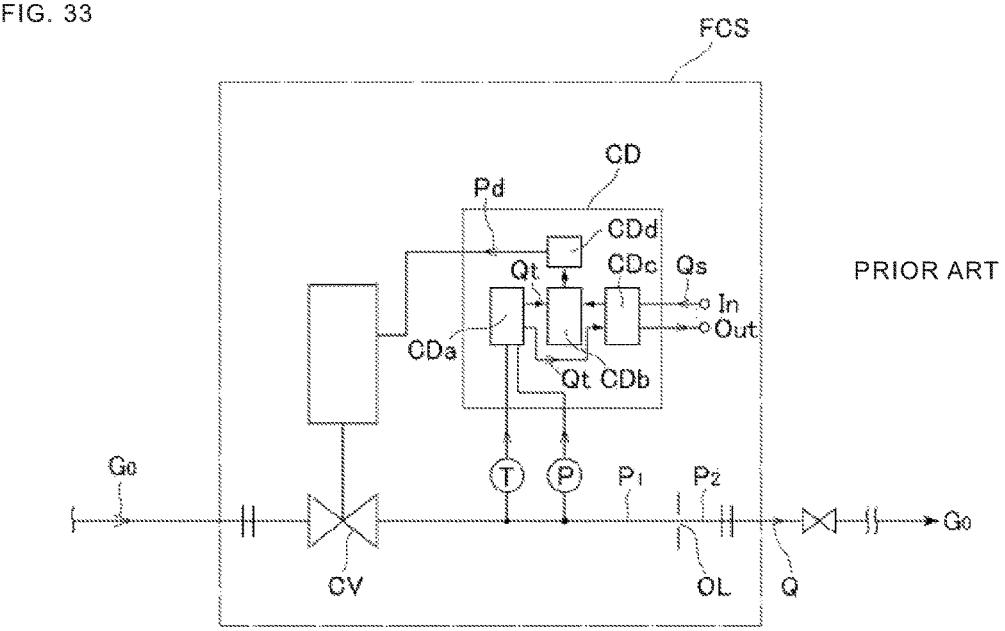
FIG. 33 is a basic structural diagram of a conventional pressure type flow control system.
Figure 34:
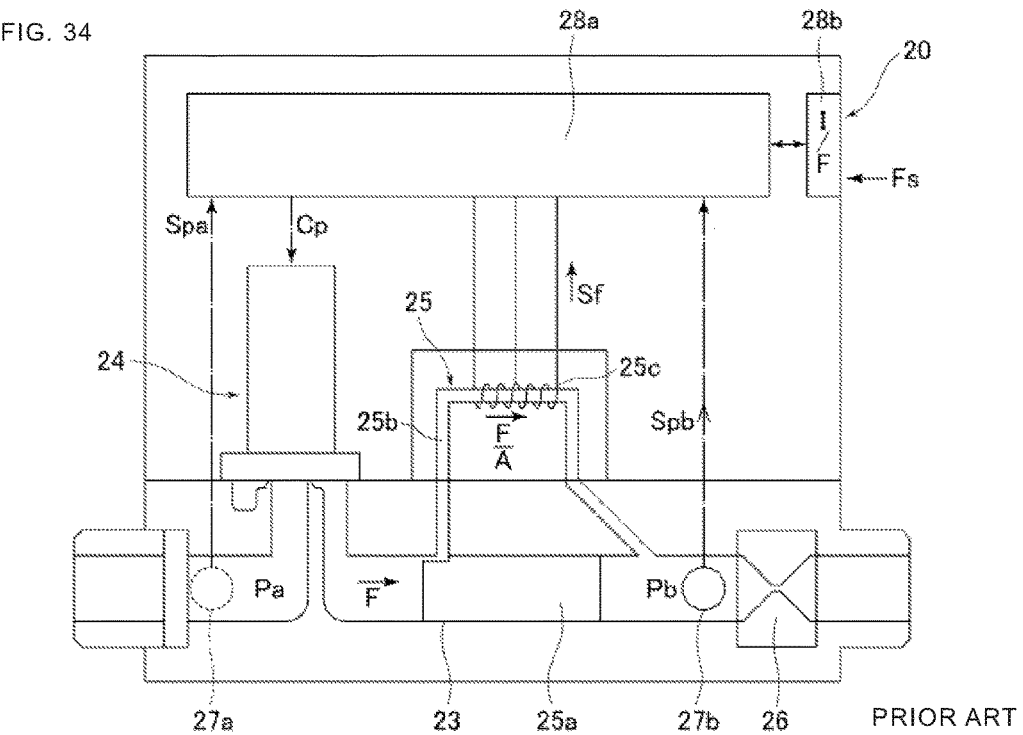
FIG. 34 is a basic structural diagram of a conventional flow control system with flow monitoring.

FIG. 32 shows a second instance of the chamber CH forming the build-down capacity BC used in a third example of the present invention. The chamber CH according to this second instance is formed of an outer cylinder CHa and an inner cylinder CHb, and further, at the center of the inner cylinder CHb, a longitudinal slot 1 circular in section is provided downward from the upper end, and the lower side of the longitudinal slot is connected to the gas outlet passage $L_2$ of the upstream side valve AV through a gas passage 1a.

A longitudinal and columnar pin 2 having a flange portion 2a on the upper end is inserted and fixed into the longitudinal slot 1 at the center of the inner cylinder CHb from the upper side, and the longitudinal slot is communicatively connected to the inside of the gap G forming the gas passage through a plurality of small holes 2b provided in the flange portion 2a, and the end portion of the gap G is communicatively connected to the gas outlet passage $L_5$ of the chamber outlet side block.

That is, in the pressure chamber CH of this second instance, the gas flowed from the lower side toward the upper side of the inner cylinder CHb flows into the gap G between the outer cylinder CHa and the inner cylinder CHb from the upper end of the inner cylinder CHb.

The gap G between the outer cylinder CHa and the inner cylinder CHb of this chamber CH is selected to be 1 to 2 mm, the gap $G_1$ between the longitudinal slot 1 and the columnar pin or screw body 2 is selected to be 0.4 to 0.8 mm, and the height of the inner cylinder CHb is selected to be 30 to 35 mm, and these are used mainly for the pressure chamber CH with an internal volume V=2 to 5 cc.

The form of the chamber CH used in the third example of the present invention can be changed as appropriate, and can be structured so that, for example, the outer peripheral surface of the inner cylinder CHb of the chamber CH shown in FIG. 32 is threaded, and by changing the height and pitch of the thread, the volume of the portion of the gap G is adjusted, or the longitudinal slot 1 of the inner cylinder CHb of the chamber CH shown in FIG. 32 is formed into a screw hole, and by screwing a columnar pin 2 formed of a screw rod into the screw hole, the volume of the portion of the gap $G_1$ is adjusted.

Further, instead of the longitudinal slot 1 of the inner cylinder CHb and the columnar pin 2 shown in FIG. 32, a plurality of longitudinal slits with small diameters communicatively connected to the gas passage 1a may be formed at the center portion of the inner cylinder CHb, or the portion of the longitudinal slot 1 may be made of a filter medium.

It is also possible that the whole or the portion to project upward of the inner cylinder CHb shown in FIG. 32 is made of a filter medium to flow the gas flowed-in from the gas outlet passage $L_2$ of the upstream side valve AV into the gap G through the filter medium, or the whole or the portion to project upward of the inner cylinder CHb is made of a porous ceramic material to distribute the gas from the gas outlet passage $L_2$ of the upstream side valve AV into the gap G through the porous ceramic material.

INDUSTRIAL APPLICABILITY

The present invention is widely applicable not only to gas supply equipment for semiconductor manufacturing equipment but also to gas supply equipment for chemical goods production equipment as long as it is a pressure type flow control system using an orifice or a critical nozzle.

DESCRIPTION OF REFERENCE SYMBOLS

FCS: pressure type flow control system
AV: upstream side valve
BC: build-down capacity
RG: pressure regulator
$N_2$: $N_2$ supply source
T: temperature detection sensor (resistance temperature detector)
$P_1$, $P_2$, $P_3$: pressure sensor
CV: control valve
OL: orifice
$V_1$, $V_2$: inlet side valve block
$V_3$, $V_4$: FCS main body block
$V_5$, $V_6$, $V_8$: outlet side block
$V_7$: gas outlet joint
$V_9$: chamber outlet side block
CP: arithmetic and control unit
CPa: flow rate arithmetic and control unit
CPb: monitoring flow rate arithmetic and control unit
$E_1$: power supply for pressure type flow control system
$E_2$: power supply for arithmetic and control unit
$E_3$: power supply for solenoid valve
ECV: electric drive unit
NR: data logger
S: signal generator
PC: arithmetic and display unit
$L_1$: gas inlet side passage of upstream side valve AV
$L_2'$, $L_2$: gas outlet side passage of upstream side valve AV
$L_3$: inlet side passage of control valve CV
$L_4$: outlet side passage of control valve CV
$L_5$: gas passage of chamber outlet side block
Cu: bar piece
Q: build-down flow rate
CH: chamber
CHa: outer cylinder
CHb: inner cylinder
1: longitudinal slot of inner cylinder
1a: gas passage
2: columnar pin or screw body
2a: flange portion
2b: small hole

The invention claimed is:

1. A flow control system with build-down system flow monitoring comprising:
    an upstream side valve AV that opens/closes distribution of a gas from a gas supply source having a desired gas supply pressure;
    a flow control system with supply pressure fluctuation resistance connected to the downstream side of the upstream side valve AV;
    a build-down capacity BC being an internal volume of a passage communicatively connecting the outlet side of the upstream side valve AV and the inlet side of the flow control system;
    a temperature detection sensor T arranged to detect the temperature of a gas distributed inside the passage forming the build-down capacity BC;
    a pressure sensor P arranged to detect the pressure of the gas distributed inside the passage forming the build-down capacity BC; and
    a monitoring flow rate arithmetic and control unit CPb operably connected to control opening and closing of the upstream side valve AV, and arranged to compute and output a monitoring flow rate Q by a build-down system by dropping the gas pressure to a set lower limit pressure value by closing the upstream side valve AV after a predetermined time of t seconds after setting the gas pressure inside the build-down capacity BC to a set upper limit pressure value by opening the upstream side valve AV, wherein the monitoring flow rate Q is computed by the following equation:

$$Q = \frac{1000}{760} \times 60 \times \frac{273}{(273+T)} \times V \times \frac{\Delta P}{\Delta t}$$

wherein T is a gas temperature (° C.), V is a build-down capacity BC (1), ΔP is a pressure drop range (set upper limit pressure value−set lower limit pressure value) (Torr), Δt is a time (sec) from closing to opening of the upstream side valve AV, wherein a chamber with an internal capacity is interposed in the gas passage between the outlet side of the upstream side valve AV and the flow control system, and by changing the internal volume of the chamber, the value of the build-down capacity BC is adjusted, wherein the chamber is structured by concentrically disposing and fixing an inner cylinder and an outer cylinder, and the gap between the inner cylinder and the outer cylinder forming the chamber is used as a gas flow passage, and a pressure sensor P3 is provided in the chamber, and
wherein a gas passage in which the gas is distributed upward from the lower side is provided inside the inner cylinder, and the gas is made to flow into the gap between the inner cylinder and the outer cylinder from the upper end surface of the inner cylinder.

2. The flow control system with build-down system flow monitoring according to claim 1, wherein the flow control system with supply pressure fluctuation resistance is a pressure type flow control system FCS including a control valve CV, an orifice OL or a critical nozzle, a pressure sensor Pi, and a flow rate arithmetic and control unit CPa; and wherein the build-down capacity BC is the internal volume of a passage communicatively connecting the outlet side of the upstream side valve AV and the inlet side of the control valve CV of the pressure type flow control system.

3. The flow control system with build-down system flow monitoring according to claim 1, wherein the gas passage provided inside the inner cylinder is a gap G1 formed between a longitudinal slot provided at the center portion of the inner cylinder and a columnar pin inserted inside the longitudinal slot.

4. The flow control system with build-down system flow monitoring according to claim 1, wherein the build-down capacity BC is set to 1.0 to 20 cc, the set upper limit pressure value is set to 400 to 200 kPa abs, the set lower limit pressure value is set to 350 kPa abs to 150 kPa abs, and the predetermined time t is set to be within 1 second.

5. The flow control system with build-down system flow monitoring according to claim 1, wherein the build-down capacity BC is set to 1.78 cc, the set upper limit pressure value is set to 370 kPa abs, the set lower limit pressure value is set to 350 kPa abs, the pressure drop range ΔP is set to 20 kPa abs, and the predetermined time t is set to be within 1 second.

6. The flow control system with build-down system flow monitoring according to claim 1, wherein the upstream side valve AV is a fluid pressure-operated solenoid direct-mounting type motor-operated valve or solenoid direct-operated type motor-operated valve, and a recovery time of the gas pressure from the set lower limit pressure value to the set upper limit pressure value by opening of the upstream side valve AV is set to be shorter than the gas pressure drop time from the set upper limit pressure value to the set lower limit pressure value by closing of the upstream side valve AV.

7. The flow control system with build-down system flow monitoring according to claim 1, wherein by inserting a bar piece to the inside of a gas flow passage between the outlet side of the upstream side valve AV and the flow control system, the passage sectional area of the gas flow passage is changed to adjust the build-down capacity BC and linearize the gas pressure drop characteristic.

8. The flow control system with build-down system flow monitoring according to claim 1, wherein a flow rate arithmetic and control unit CPa of the flow control system and the build-down monitoring flow rate arithmetic and control unit CPb are integrally formed.

9. A flow control system with build-down system flow monitoring comprising:
    an upstream side valve AV that opens/closes distribution of a gas from a gas supply source having a desired gas supply pressure;
    a flow control system with supply pressure fluctuation resistance connected to the downstream side of the upstream side valve AV;
    a build-down capacity BC being an internal volume of a passage communicatively connecting the outlet side of the upstream side valve AV and the inlet side of the flow control system;
    a temperature detection sensor T arranged to detect the temperature of a gas distributed inside the passage forming the build-down capacity BC;
    a pressure sensor P arranged to detect the pressure of the gas distributed inside the passage forming the build-down capacity BC; and
    a monitoring flow rate arithmetic and control unit CPb operably connected to control opening and closing of the upstream side valve AV, and arranged to compute and output a monitoring flow rate Q by a build-down system by dropping the gas pressure to a set lower limit pressure value by closing the upstream side valve AV after a predetermined time of t seconds after setting the gas pressure inside the build-down capacity BC to a set upper limit
pressure value by opening the upstream side valve AV, wherein the monitoring flow rate Q is computed by the following equation:

$$Q = \frac{1000}{760} \times 60 \times \frac{273}{(273+T)} \times V \times \frac{\Delta P}{\Delta t}$$

wherein T is a gas temperature (° C.), V is a build-down capacity BC (1), ΔP is a pressure drop range (set upper limit pressure value−set lower limit pressure value) (Torr), Δt is a time (sec) from closing to opening of the upstream side valve AV, wherein a chamber with an internal capacity is interposed in the gas passage between the outlet side of the upstream side valve AV and the flow control system, and by changing the internal volume of the chamber, the value of the build-down capacity BC is adjusted, wherein the chamber is structured by concentrically disposing and fixing an inner cylinder and an outer cylinder, and the gap between the inner cylinder and the outer cylinder forming the chamber is used as a gas flow passage, and a pressure sensor P3 is provided in the chamber, wherein the inner cylinder is an inner cylinder with slits inside of which the gas is distributed, and wherein the inner cylinder is an inner cylinder provided with slits or a filter medium inside of which the gas is distributed, or an inner cylinder made of a filter medium or a porous ceramic material.

* * * * *